(12) United States Patent
Davis et al.

(10) Patent No.: US 12,372,127 B2
(45) Date of Patent: Jul. 29, 2025

(54) BRAKE SYSTEM FOR MINE TRUCKS

(71) Applicant: CMBF Products, Inc., Waukesha, WI (US)

(72) Inventors: Chris Davis, Hinckley, OH (US); Kyle Hummel, Hudson, OH (US); Edwin Zak, Grafton, OH (US)

(73) Assignee: CMBF Products, Inc., Waukesha, WI (US)

( * ) Notice: Subject to any disclaimer, the term of this patent is extended or adjusted under 35 U.S.C. 154(b) by 566 days.

(21) Appl. No.: 17/466,483

(22) Filed: Sep. 3, 2021

(65) Prior Publication Data

US 2021/0396286 A1 Dec. 23, 2021

Related U.S. Application Data

(63) Continuation-in-part of application No. 17/102,799, filed on Nov. 24, 2020, now abandoned, which is a
(Continued)

(51) Int. Cl.
*F16D 65/097* (2006.01)
*B60T 13/22* (2006.01)
(Continued)

(52) U.S. Cl.
CPC .......... *F16D 65/0971* (2013.01); *B60T 13/22* (2013.01); *F16D 55/24* (2013.01);
(Continued)

(58) Field of Classification Search
CPC ..... F16D 65/0971; F16D 55/24; F16D 57/007
See application file for complete search history.

(56) References Cited

U.S. PATENT DOCUMENTS

| 2,326,960 A | 8/1941 | McCune |
| 2,790,516 A | 4/1957 | Wright et al. |

(Continued)

FOREIGN PATENT DOCUMENTS

| EP | 1500839 A2 * | 1/2005 | ........... F16D 65/853 |
| EP | 1755205 A1 * | 2/2007 | .............. E02F 9/128 |

(Continued)

OTHER PUBLICATIONS

International Preliminary Report on Patentability for Application No. PCT/US2018/041987 dated Jan. 28, 2020 (7 pages).
(Continued)

*Primary Examiner* — Melody M Burch
(74) *Attorney, Agent, or Firm* — Michael Best & Friedrich LLP

(57) ABSTRACT

A brake system includes a series of rotors for operatively coupling to a shaft and stators for operatively coupling to a frame. A service brake system includes a singular annular service piston extending continuously around the series of rotors and stators and a parking brake system includes a singular annular parking piston positioned to extend continuously around the series of rotors and stators. The service piston nests with the parking piston, under a spring bias, such that the parking piston and service piston continuously engage together around the series of rotors and stators to thereby create the parking brake forces. Springs act on the parking piston to drive the parking piston and nested service piston to engage for parking brake forces. Pressurization of the parking piston deactuates the nested pistons. Then separate pressurization of fluid acts on the service piston to overcome the spring bias and separate the service piston from the parking piston to create service brake forces.

19 Claims, 18 Drawing Sheets

Related U.S. Application Data continuation of application No. 16/034,666, filed on Jul. 13, 2018, now Pat. No. 10,851,859.

(60) Provisional application No. 62/537,153, filed on Jul. 26, 2017.

(51) Int. Cl.
  *F16D 55/24* (2006.01)
  *F16D 55/00* (2006.01)
  *F16D 57/00* (2006.01)

(52) U.S. Cl.
  CPC .... *F16D 65/0972* (2013.01); *B60Y 2200/417* (2013.01); *F16D 2055/0091* (2013.01); *F16D 2055/0095* (2013.01); *F16D 57/007* (2013.01)

(56) References Cited

U.S. PATENT DOCUMENTS

| | | | |
|---|---|---|---|
| 4,024,936 A | 5/1977 | Crabb | |
| 4,263,991 A | 4/1981 | Morgan et al. | |
| 4,696,378 A | 9/1987 | Brooks | |
| 4,765,227 A * | 8/1988 | Balazs | B21D 24/14 |
| | | | 277/572 |
| 5,050,710 A | 9/1991 | Bargfrede | |
| 5,186,284 A * | 2/1993 | Lamela | F16D 55/36 |
| | | | 188/170 |
| 5,540,305 A | 7/1996 | Hammond et al. | |
| 6,089,357 A | 7/2000 | Jackson et al. | |
| 6,260,668 B1 | 7/2001 | McClanahan | |
| 6,302,244 B1 | 10/2001 | Kernik et al. | |
| 6,405,837 B1 | 6/2002 | Muramoto | |
| 6,459,182 B1 | 10/2002 | Pfann et al. | |
| 7,909,147 B1 | 3/2011 | Schnell | |
| 8,662,277 B2 | 3/2014 | Schoon | |
| 9,429,227 B2 | 8/2016 | Noerenberg | |
| 10,851,859 B2 * | 12/2020 | Burns | F16D 65/0971 |
| 2002/0148695 A1 | 10/2002 | Latsko | |
| 2004/0251091 A1 | 12/2004 | Archer | |
| 2010/0012446 A1 | 1/2010 | Ollat et al. | |
| 2016/0102023 A1 | 4/2016 | La Forest et al. | |
| 2016/0332416 A1 * | 11/2016 | Troester | B33Y 30/00 |
| 2018/0252284 A1 | 9/2018 | Charles et al. | |

FOREIGN PATENT DOCUMENTS

| | | | |
|---|---|---|---|
| FR | 2820794 | A1 | 8/2002 |
| GB | 2012012 | A1 | 7/1979 |
| JP | S30004963 | A | 8/1941 |
| JP | S5365568 | A | 6/1978 |
| JP | S54016071 | A | 2/1979 |
| JP | S63092837 | A | 4/1988 |
| JP | H04054332 | A | 2/1992 |
| JP | 2000515615 | A | 11/2000 |
| JP | 2006144927 | A | 6/2006 |
| WO | 9805879 | A1 | 2/1998 |

OTHER PUBLICATIONS

International Search Search Report and Written Opinion for Application No. PCT/US2018/041987 dated Oct. 5, 2018 (12 pages).

Chinese Patent Office Action and Search Report for Application No. 201880049263.8 dated Dec. 1, 2021 (24 pages including English translation).

Indian Patent Office Action for Application No. 202017001429 dated Aug. 19, 2021 (6 pages including English translation).

Japanese Patent Office Notice of Reasons for Rejection for Application No. 2020-504134 dated Feb. 6, 2023 (13 bages including English translation).

Belarusian Patent Office Action for U.S. Appl. No. 20/200,055 dated Jan. 16, 2023 (7 pages including English translation).

Japanese Patent Office Action for Application No. 2020-504134 dated Jul. 10, 2023 (14 pages including english translation).

Japanese Patent Office Notice of Reasons for Rejection for Application No. 2020-504134 dated Jun. 27, 2022 (13 bages including English translation).

\* cited by examiner

BRAKE SYSTEM FOR MINE TRUCKS

CROSS-REFERENCE TO RELATED APPLICATIONS

This application is a Continuation-in-Part of U.S. patent application Ser. No. 17/102,799 Filed Nov. 24, 2020 (pending), which is a Continuation of U.S. patent application Ser. No. 16/034,666 filed Jul. 13, 2018 (issued as U.S. Pat. No. 10,851,859 on Dec. 1, 2020), which patent claims the benefit of priority to U.S. Provisional Patent Application Ser. No. 62/537,153 filed Jul. 26, 2017 (expired), the disclosures of which are incorporated by reference herein in their entirety.

TECHNICAL FIELD

The present invention relates to a brake system and, more particularly, to a brake system for diesel electric vehicles, including large off-highway equipment vehicles such as mine trucks, and other pieces of equipment.

BACKGROUND OF THE INVENTION

Mine trucks and other large off-highway equipment vehicles are often configured as diesel electric vehicles. Diesel electric vehicles use a diesel engine to generate electricity, which is used to power multiple electric motors to propel the vehicle. The electric motors can also be operated in regenerative mode, where the motor is used to generate electricity. In regenerative mode, the electric motors act as brakes, slowing or retarding the vehicle. The electricity generated by the motors in the braking process can then either be stored in a battery or discarded as waste heat.

As a result of this propulsion system, mechanical brakes on a diesel electric vehicle have two main functions. First, the mechanical brakes may serve as emergency brakes. To that end, in case of electrical or motor failure, the mechanical brakes must be able to stop an overloaded vehicle moving at full speed. The vehicles are required to meet the requirements of the ISO 3450 specification. Second, the mechanical brakes may provide final braking of the vehicle. In this regard, at low speed (e.g., under 10 km/hr), the electric motors are not as effective at retarding or slowing the vehicle. Thus, the mechanical brakes are used to bring the vehicle to a complete stop. Typically, these stops are very low energy.

Conventional mechanical brakes used on diesel electric vehicles have one of two designs. Typically, for small to medium sized trucks (e.g., less than or equal to approximately 200-300 tons), dry caliper brakes are typically used. Such brakes consist of a caliper, a set of pads, and a steel or cast iron rotor. While these brakes may be relatively inexpensive, high wear rates can require the pads to be replaced as frequently as every 6-12 months. Moreover, these brakes are not capable of passing the ISO 3450 emergency stop specification, when used for heavier vehicles. In this regard, when energies and temperatures become undesirably high, increased wear and/or coefficient fade result.

For medium to large sized trucks (e.g., greater than or equal to approximately 200-300 tons), wet brakes are typically used. Such brakes consist of a pack of friction discs and steel opposing plates. The friction discs include a paper-based friction material bonded to both sides of a steel core. Grooves are also cut into the friction material to aid in oil flow and distribution. The friction discs may include a spline cut into the inner diameter, while the steel opposing plates may include a spline cut into the outer diameter. Typically, the friction discs rotate, while the opposing plates do not. The discs are enclosed in a housing with an actuating piston on one side. The housing may be partially filled with oil, or oil may be circulated through the housing by a pump. When braking is desired, the piston is actuated, thereby compressing all of the friction and opposing discs to create braking torque. While these brakes may have a relatively long life and may readily pass the ISO 3450 specification and emergency stops, parasitic drag caused by the oil flow in the brake when the brake is disengaged can rob the engine of horsepower and result in decreased fuel efficiencies. Moreover, these brakes are significantly larger and more complex than dry caliper brakes, requiring oil pumps, reservoirs, heat exchangers, and other componentry, thereby resulting in greater expense and weight.

Thus, there is a need for an improved brake system for off-highway equipment vehicles such as mine trucks that overcome drawbacks of conventional brake systems discussed above.

SUMMARY OF THE INVENTION

In one embodiment a brake system for a piece of equipment having a frame and a shaft rotatable relative to the frame includes a series of rotors and stators, including a plurality of rotors configured to be operatively coupled to the shaft and configured to rotate with the shaft relative to the frame, and a plurality of stators configured to be operatively coupled to the frame and configured to be fixed against rotation relative to the frame. A service brake system includes an annular service piston positioned to extend continuously around the series of rotors and stators such that pressurization of fluid in the service brake system acts on the service piston opposite the series of rotors and stators and drives the service piston to continuously engage around the series of rotors and stators. The rotors and stators are compressed together by the service piston to thereby create the service braking function. A parking brake system includes an annular parking piston that is positioned to extend continuously around the series of rotors and stators. A plurality of springs creates a spring bias that acts on the parking brake piston to drive the parking piston to continuously engage around the series of rotors for compression to thereby create the parking braking function.

In one embodiment, the service piston is configured for nesting with the parking piston such that the parking piston and service piston continuously engage together when the parking piston is driven to engage around the series of rotors and stators for the parking braking function. The pressurization of the parking brake system acts on the parking piston against the spring bias to move the nested parking piston and service piston away from the rotors and stators and remove the parking brake function.

In another embodiment, the service piston is held in a nested position together with the parking piston by a plurality of springs for creating a spring bias to keep the parking piston and service piston together. The pressurization of fluid in the service brake system acts on the service piston to overcome the spring bias and to separate the nested service piston from the parking piston to create a separate service braking function against the rotors and stators. The springs that create the bias to nest the two pistons may be positioned coaxially with the springs creating a spring bias that acts on the parking piston to create the parking braking function.

In one embodiment, the rotors or stators comprise carbon-carbon material and may be monolithic elements.

In an embodiment, the brake includes a gland ring configured for surrounding the service piston and parking piston. The gland ring has a plurality of seal elements for sealing the service piston and parking piston with respect to the gland ring and other elements of the brake system for containment of pressurized fluid acting on the service piston and parking piston for creating the noted parking brake function and service brake function.

DETAILED DESCRIPTION

Figure 1:
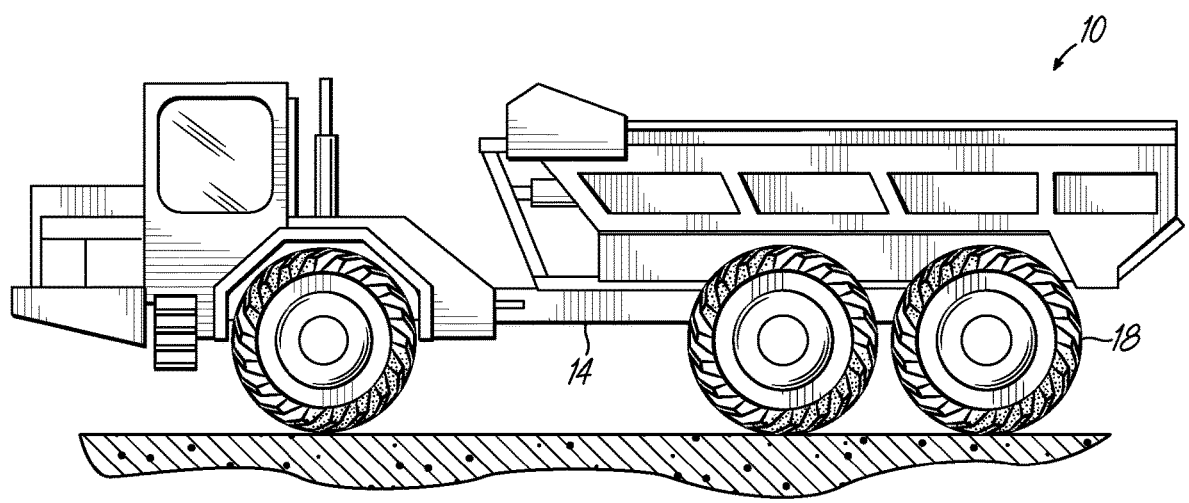
FIG. 1 is a side elevation view of a mine truck including an exemplary brake system in accordance with the principles of the present invention.
Figure 2:
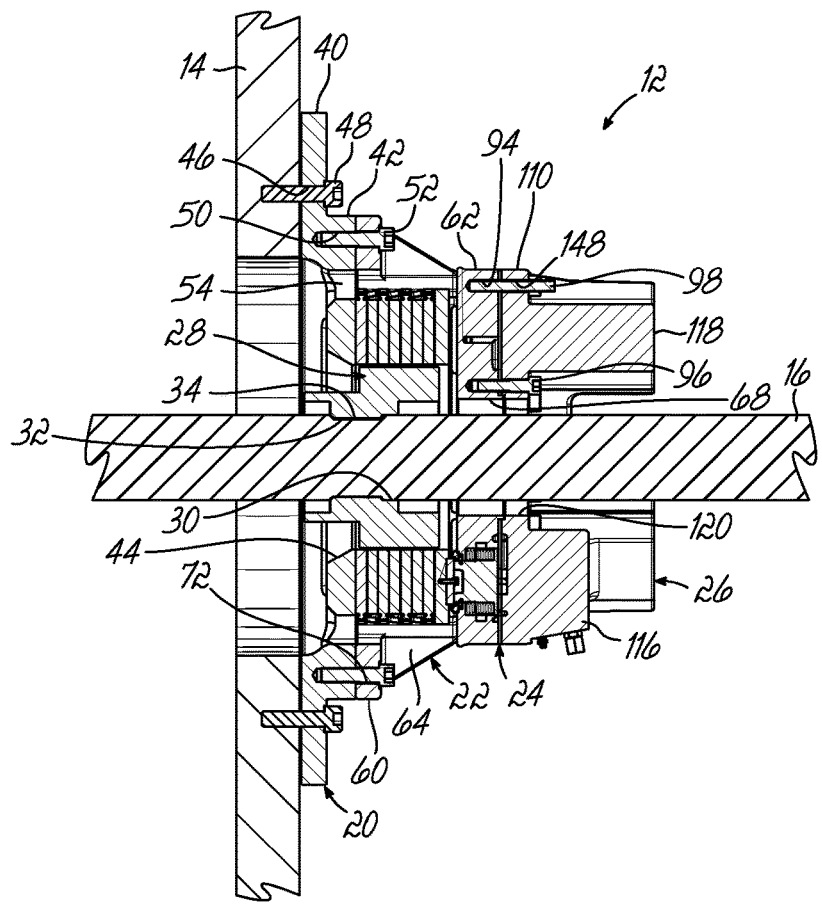
FIG. 2 is a detail cross sectional view of the mine truck of FIG. 1, showing the exemplary brake system coupled to the frame and rotatable shaft of the mine truck.

Referring now to the drawings, and to FIGS. 1 and 2 in particular, an off-highway equipment vehicle, such as a mine truck 10 configured as a diesel electric vehicle, includes an exemplary brake system 12 in accordance with the principles of the present invention. While a mine truck 10 is shown, the brake system 12 may be configured for use on any suitable off-highway equipment vehicle or other piece of equipment, such as a continuous track vehicle. The illustrated mine truck 10 includes a frame 14, a shaft 16 such as a front or rear axle or spindle rotatable relative to the frame 14, and at least one wheel 18 mounted to the shaft 16 for rotating therewith. As set forth in greater detail below, various components of the brake system 12 are operatively coupled to the frame 14 and/or to the shaft 16 for providing resistance to rotation of the shaft 16 and wheel 18, and thus to movement of the mine truck 10. The brake system 12 may provide improved braking performance with many of the advantages of a wet brake while avoiding many of the disadvantages of a wet brake. For example, the brake system 12 may exhibit a low wear rate, and thus a long life, without the parasitic drag caused by oil in wet brakes and with reduced complexity, weight, and cost. The features of the brake system 12 are set forth in further detail below to clarify each of these functional advantages and other benefits provided in this disclosure.

Figure 3:
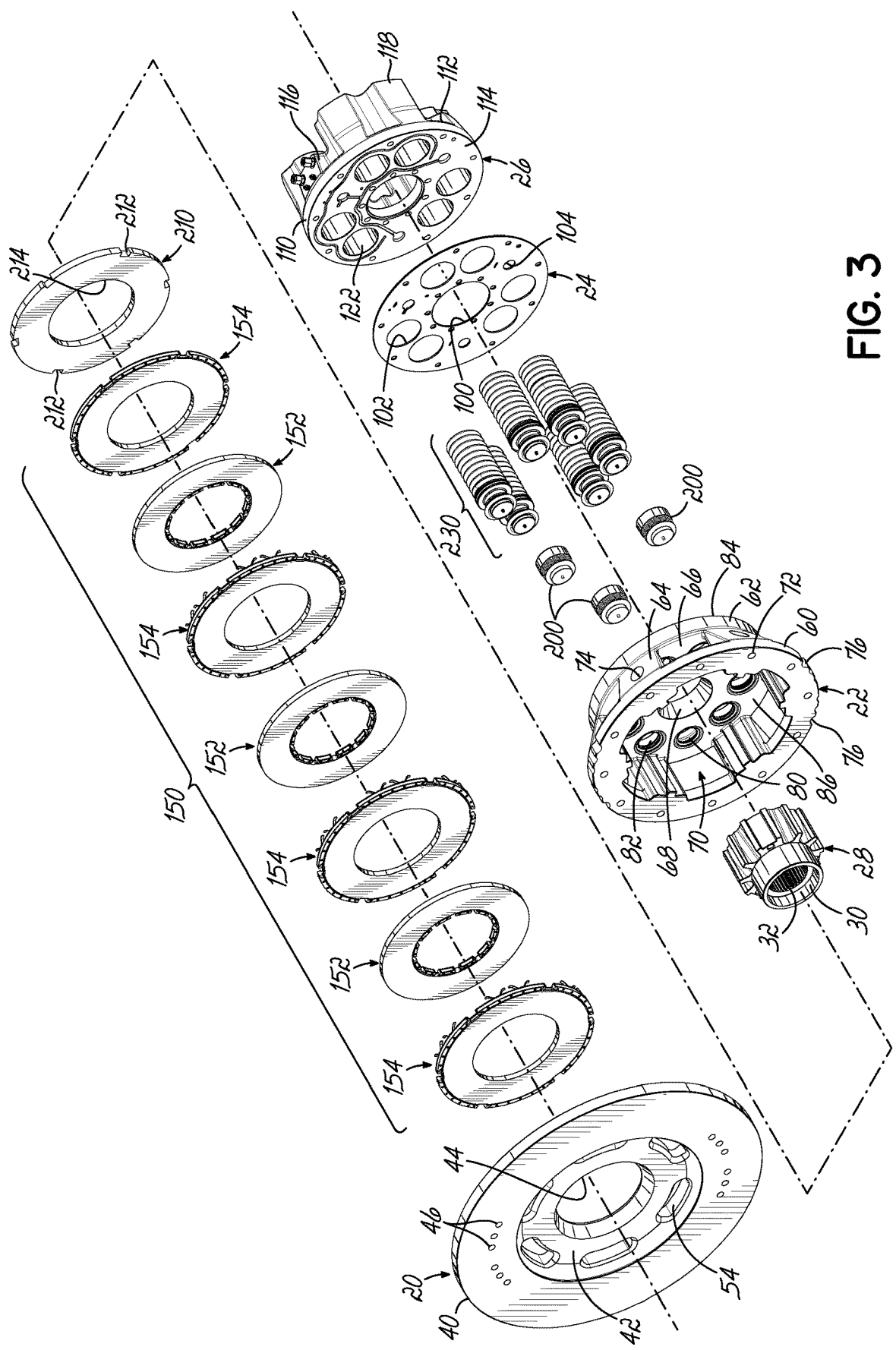
FIG. 3 is an exploded view of the brake system of FIG. 2.

Referring now to FIGS. 2 and 3, the brake system 12 includes a base portion 20, a cage portion 22, a hydraulic separator plate 24, and a cap portion 26 fixedly coupled together to form a housing and configured to be mounted to the frame 14 of the mine truck 10, as well as a hub 28 configured to be mounted to the shaft 16. To that end, the hub 28 includes a central bore 30 having splines 32 for mechanically engaging corresponding splines 34 of the shaft 16 such that the hub 28 may rotate with rotation of the shaft 16.

The illustrated base portion 20 includes a generally annular plate 40 and a generally annular platform 42 extending from the plate 40 toward the cage portion 22 and defining a central bore 44 for receiving the shaft 16 of the mine truck 10. The base portion 20 is configured to be operatively coupled to the frame 14 of the mine truck 10 so as to be fixed against movement relative to the frame 14. To that end, the illustrated base portion 20 includes a plurality of through-bores 46 provided in the plate 40 for receiving fasteners, such as threaded bolts 48, to couple the base portion 20 to the frame 14. Notches (not shown) may be provided in the periphery of the platform 42 for accommodating the heads of the threaded bolts 48. The illustrated base portion 20 also includes a plurality of threaded blind bores 50 provided in the platform 42 for threadably receiving fasteners, such as threaded bolts 52, to couple the cage portion 22 to the base portion 20. As shown, the platform 42 may include a plurality of air flow slots 54 at or near its periphery, for reasons discussed below.

The illustrated cage portion 22 includes a lower ring 60 and an upper body 62 spaced apart and coupled together by a plurality of supports 64 separated from each other by openings 66. The upper body 62 is generally annular and defines a central bore 68 for alignment with the central bore 44 of the base portion 20 and to receive the shaft 16 of the mine truck 10. Together, the lower ring 60, upper body 62, and supports 64 define a generally interior space 70 for receiving the hub 28 and/or other components, which may be at least partially enclosed on the side adjacent the lower ring 60 by the platform 42 of the base portion 20. To that end, the lower ring 60 of the cage portion 22 includes a plurality of through-bores 72 for receiving the threaded bolts 52 for coupling with the base portion 20. As shown, a portion of the through-bores 72 extend through the supports 64, and counterbores 74 may be provided in the supports 64 concentric with such through-bores 72 for receiving the heads of the threaded bolts 52 which couple the cage portion 22 to the base portion 20. In addition or alternatively, notches 76 may be provided in the periphery of the lower ring 60 for accommodating the heads of the threaded bolts 48 which couple the base portion 20 to the frame 14.

Figure 4:
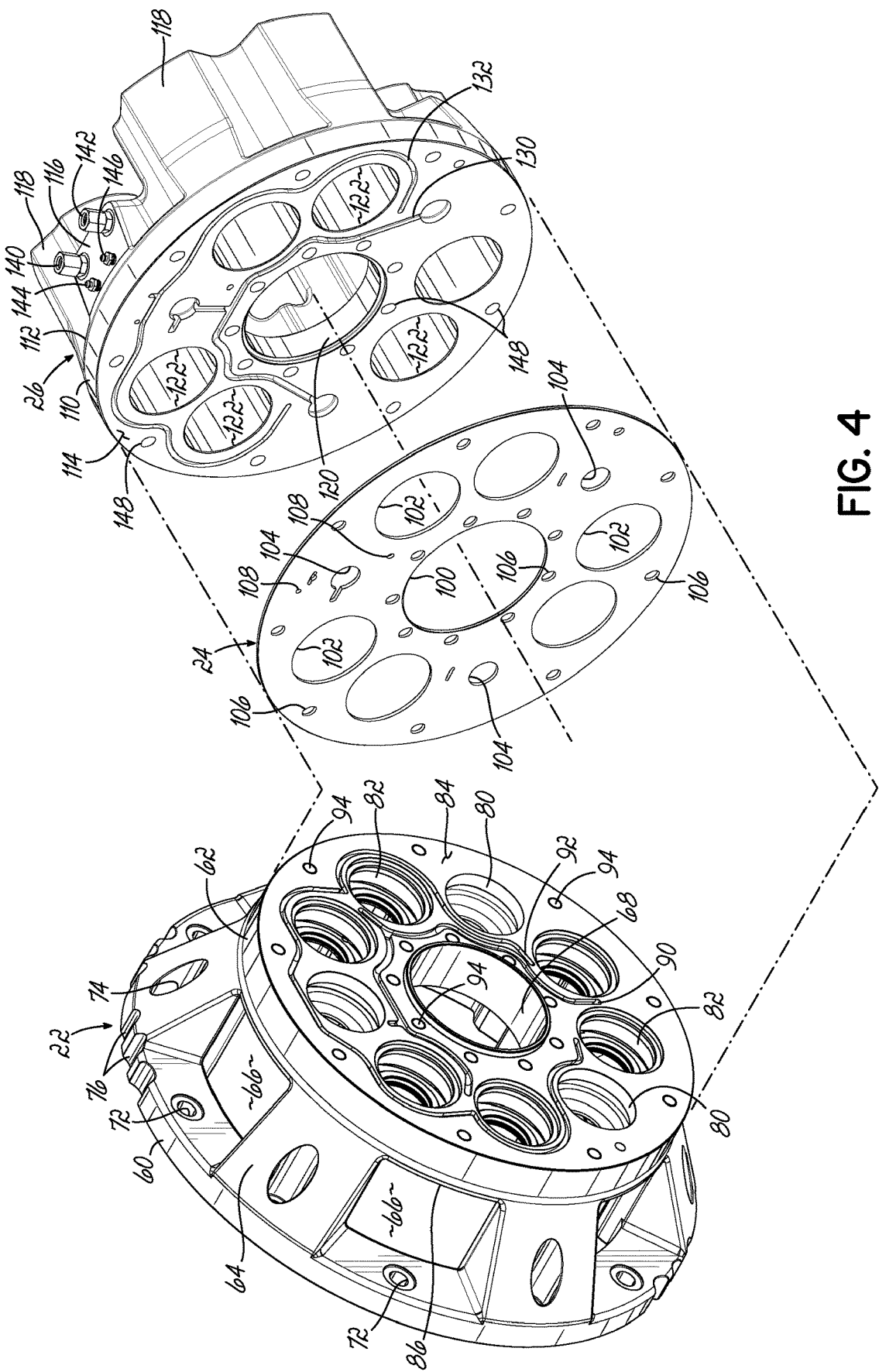
FIG. 4 is a partial exploded view of the brake system of FIG. 2, showing the hydraulic fluid pathways of the brake system.

Referring now to FIG. 4, with continuing reference to FIGS. 2 and 3, the upper body 62 of the cage portion 22 includes pluralities of first and second chambers 80, 82 extending between first and second surfaces 84, 86 of the upper body 62 such that each chamber 80, 82 is open to each of the first and second surfaces 84, 86. In the illustrated cage portion 22, the plurality of first chambers 80 includes three first chambers 80 and the plurality of second chambers 82 includes six second chambers 82, arranged in pairs between the first chambers 80. However, it will be appreciated that other numbers and/or arrangements of the chambers 80, 82 may be used. As shown, first and second fluid bleeder pathways 90, 92 extend along the first surface 84 of the upper body 62 for bleeding hydraulic fluid from the pluralities of first and second chambers 80, 82, respectively. The functions and purposes of the chambers 80, 82 and fluid bleeder pathways 90, 92 are discussed in greater detail below. In any event, the illustrated cage portion 22 includes a plurality of threaded blind bores 94 provided in the upper body for threadably receiving fasteners, such as threaded bolts 96 and/or threaded studs 98, to couple the separator plate 24 and/or cap portion 26 to the cage portion 22.

As shown, the separator plate 24 is generally annular and defines a central bore 100 for alignment with the central bores 44, 68 of the base and cage portions 20, 22 and to receive the shaft 16 of the mine truck 10. The separator plate 24 includes a plurality of chamber bores 102 configured for alignment with the plurality of second chambers 82 of the cage portion 22, and a plurality of fluid supply openings 104 for alignment with the plurality of first chambers 80, such that the separator plate 24 partially covers each of the first chambers 80 and the fluid supply openings 104 allow hydraulic fluid to enter each of the first chambers 80 from a side of the separator plate 24 opposite the cage portion 22. The illustrated separator plate 24 further includes a plurality of through bores 106 for receiving the threaded bolts 96 and/or threaded studs 98 which couple the separator plate 24 to the cage portion 22 and/or cap portion 26.

When coupled to the upper body 62 of the cage portion 22, the separator plate 24 bounds the first and second fluid bleeder pathways 90, 92 in the first surface 84 of the upper body 62 to generally retain hydraulic fluid therein. As shown, the separator plate 24 includes fluid bleeder openings 108 for allowing hydraulic fluid to exit the first and second fluid bleeder pathways 90, 92 to the side of the separator plate 24 opposite the cage portion 22.

The illustrated cap portion 26 includes a generally annular plate 110 having first and second surfaces 112, 114 and pluralities of first and second towers 116, 118 extending from the second surface 114 away from the cage portion 22. The plate 110 defines a central bore 120 for alignment with the central bores 44, 68, 100 of the base portion 20, cage portion 22, and separator plate 24, and to receive the shaft 16 of the mine truck 10. Pairs of blind bores 122 extend from the second surface 114 of the plate 110 into each of the second towers 118 and are configured for alignment with the chamber bores 102 of the separator plate 24 and the second chambers 82 of the cage portion 22. As shown, first and second fluid supply pathways 130, 132 extend along the second surface 114 of the plate 110 for supplying hydraulic fluid to the pluralities of first and second chambers 80, 82, respectively. First and second hydraulic fluid inlet ports 140, 142 are provided in one of the first towers 116 and fluidically communicate with the first and second fluid supply pathways 130, 132, respectively. Similarly, first and second hydraulic fluid bleeder ports 144, 146 are provided in one of the first towers 116 and fluidically communicate with the first and second fluid bleeder pathways 90, 92, respectively.

As shown, the cap portion 26 includes a plurality of through bores 148 provided in the plate 110 for receiving the threaded bolts 96 and/or threaded studs 98 which couple the cap portion 26 to the separator plate 24 and/or cage portion 22. When the cap portion 26 is coupled to the separator plate 24, the separator plate 24 bounds the first and second fluid supply pathways 130, 132 in the second surface 114 of the plate 110 to generally retain hydraulic fluid therein. The fluid supply openings 104 in the separator plate 24 allow fluid to travel from the fluid inlet ports 140, 142 to the corresponding chambers 80, 82.

Figure 5:
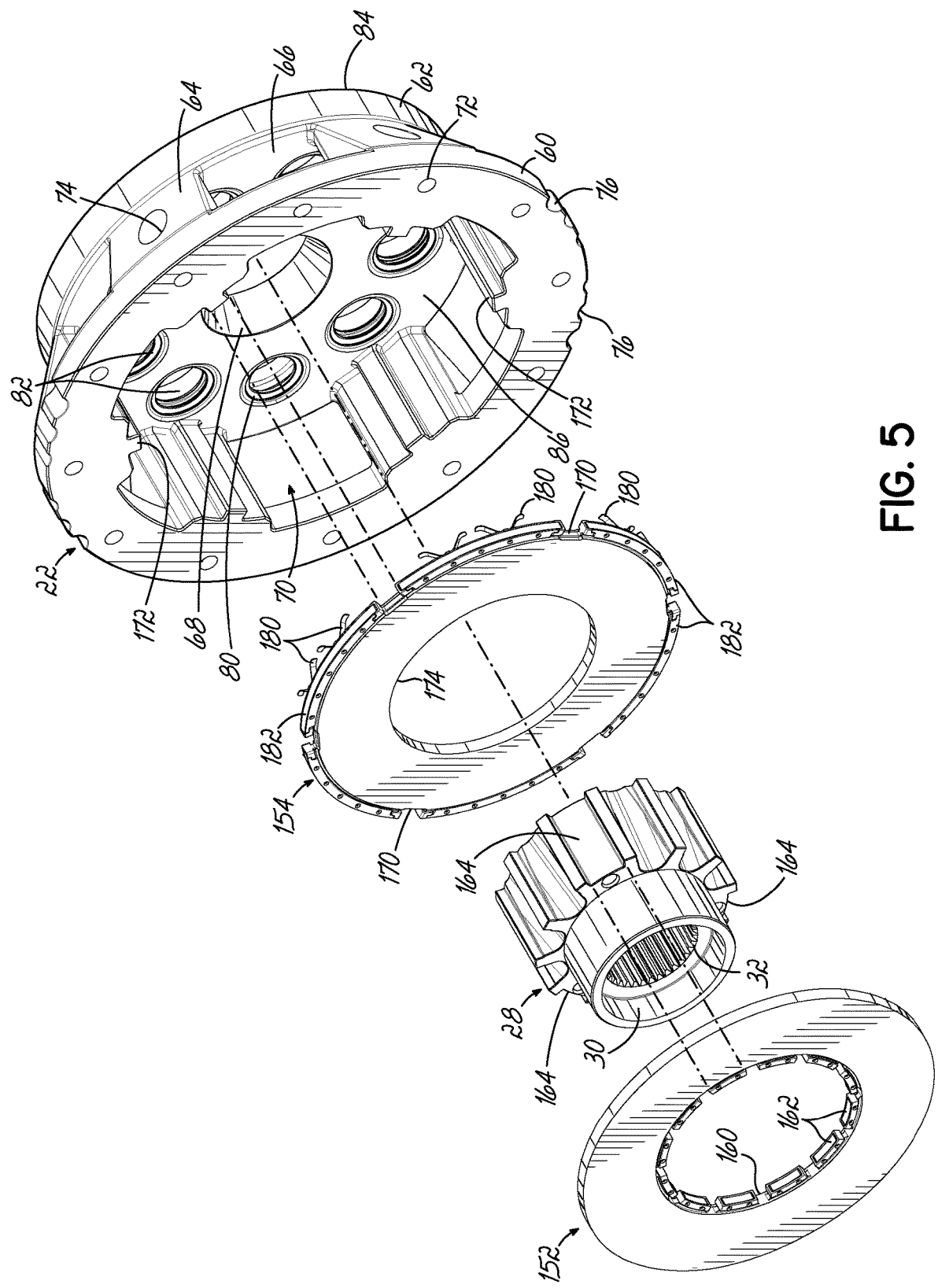
FIG. 5 is a partial exploded view of the brake system of FIG. 2, showing various interlocking features of the brake system.

Referring now to FIG. 5, with continuing reference to FIGS. 2 and 3, the brake system 12 includes a series or pack 150 of generally disc-shaped rotors 152 and stators 154 housed within the interior space 70 of the cage portion 22. The rotors 152 are operatively coupled to the shaft 16 and configured to rotate with the shaft 16 relative to the frame 14. To that end, the rotors 152 each include a central bore 160 having a plurality of keys 162 configured to be received by corresponding keyways 164 of the hub 28. When the shaft 16 and hub 28 rotate together, the keyways 164 may mechanically engage the corresponding keys 162, thereby causing the rotors 152 to rotate with the hub 28 and shaft 16. It will be appreciated that the rotors 152 may be coupled to the shaft 16 in various other ways without departing from the scope of the invention.

The stators 154 are operatively coupled to the frame 14 and configured to be fixed against rotation relative to the frame 14. To that end, the stators 154 each include notches 170 along their outer peripheries for receiving corresponding ridges 172 of the cage portion 22, and a central bore 174 sized to clear the hub 28. In this manner, when the shaft 16 rotates, the engagement between the ridges 172 and the notches 170 may prevent the stators 154 from rotating relative to the frame 14, while the hub 28 and/or shaft 16 may rotate freely within the central bore 174. In the embodiment shown, the ridges 172 are provided on inner surfaces of the supports 64 of the cage portion 22. It will be appreciated that the stators 154 may be coupled to the frame 14 in various other ways without departing from the scope of the invention.

The rotors 152 and stators 154 are free to move slightly along the axis of the shaft 16 such that, when the rotors 152 and stators 154 are spaced apart from each other, the rotors 152 are permitted to rotate freely with the shaft 16 and such that, when the rotors 152 and stators 154 are compressed or clamped together, braking torque may be created by friction generated between the rotors 152 and stators 154 to thereby resist rotation of the rotors 152. In that regard, each of the rotors 152 and/or stators 154 may be constructed of a friction material suitable for braking applications. For example, the rotors 152 and/or stators 154 may comprise monolithic pieces of carbon fiber reinforcement in a matrix of carbon, commonly referred to as carbon fiber-reinforced carbon or carbon-carbon. It will be appreciated that carbon-carbon may exhibit a low wear rate and thus provide durability to the rotors 152 and stators 154, and that a monolithic construction may allow a substantial portion of the thickness of each rotor 152 and stator 154 to be available as usable material during braking. However, any other suitable material and/or suitable construction (e.g., non-monolithic) may be used for the rotors 152 and/or stators 154. For example, the rotors 152 and/or stators 154 may include a sintered metallic-based friction material bonded to both sides of a steel core or manufactured into a monolithic piece. In one embodiment, the pluralities of rotors 152 and stators 154 are configured to be free from oil flow during use. In any event, the braking torque created by compressing the rotors 152 and stators 154 may be transferred from the rotors 152 to the hub 28 via the keys 162 and keyways 164, and may be transferred from the hub 28 to the shaft 16 via the splines 32, 34 to resist rotation of the shaft 16 and wheel 18.

It will be appreciated that substantial heat may be generated during the creation of braking torque by the rotors 152 and stators 154. The air flow slots 54 in the platform 42 of the base portion 20 may assist in transferring such away from the brake system 12. In addition or alternatively, the openings 66 between the supports 64 of the cage portion 22 may assist in transferring the heat away from the brake system 12.

As shown, generally V-shaped flat springs 180 may be positioned between adjacent stators 154 at or near their peripheries to bias the stators 154 away from each other and thereby prevent the stators 154 from inadvertently clamping a rotor 152 therebetween when braking torque is not desired, which would lead to parasitic drag. For example, the flat springs 180 may be coupled to peripheral metallic clips 182 positioned over the stators 154. Such clips 182 may be load-bearing in order to avoid damaging the stators 154 under loads carried between the stators 154 by the flat springs 180. In the embodiment shown, three rotors 152 and four stators 154 are arranged in an alternating sequence starting and ending with a stator 154. However, various other numbers of rotors and stators may be arranged in any suitable sequence. For example, four rotors and five stators may be arranged in an alternating sequence. In one embodiment, each front wheel of the mine truck may be equipped with a brake system having a greater number of rotors and stators than the brake systems of the rear wheels due to reduced torque requirements for the rear wheels, such as when the rear brake systems operate behind a gear box. For example, the rear brake system may contain three rotors and four stators, while the front brake system may contain four rotors and five stators.

Figure 6:
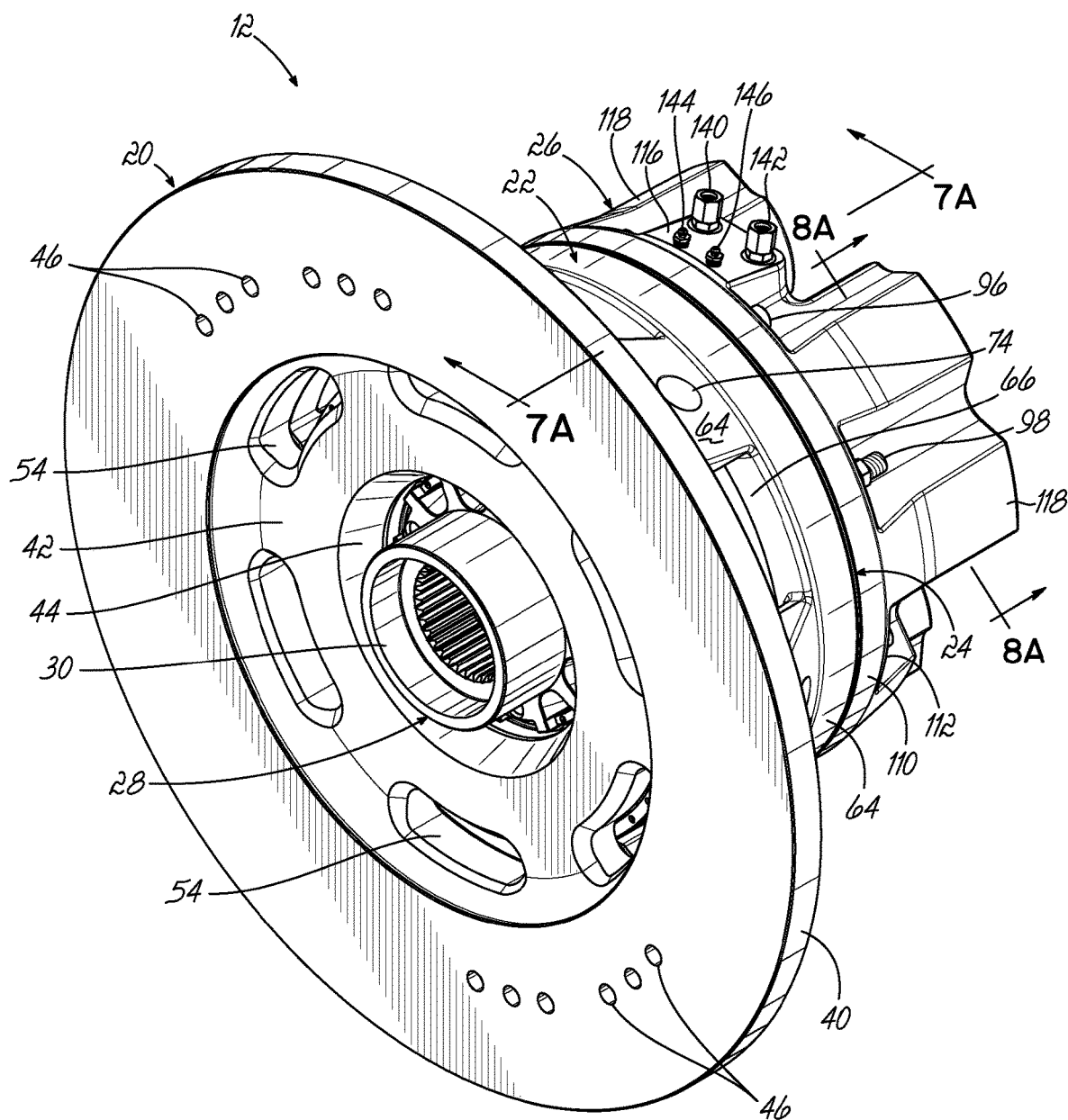
FIG. 6 is a perspective view of the brake system of FIG. 2.
Figure 7A:
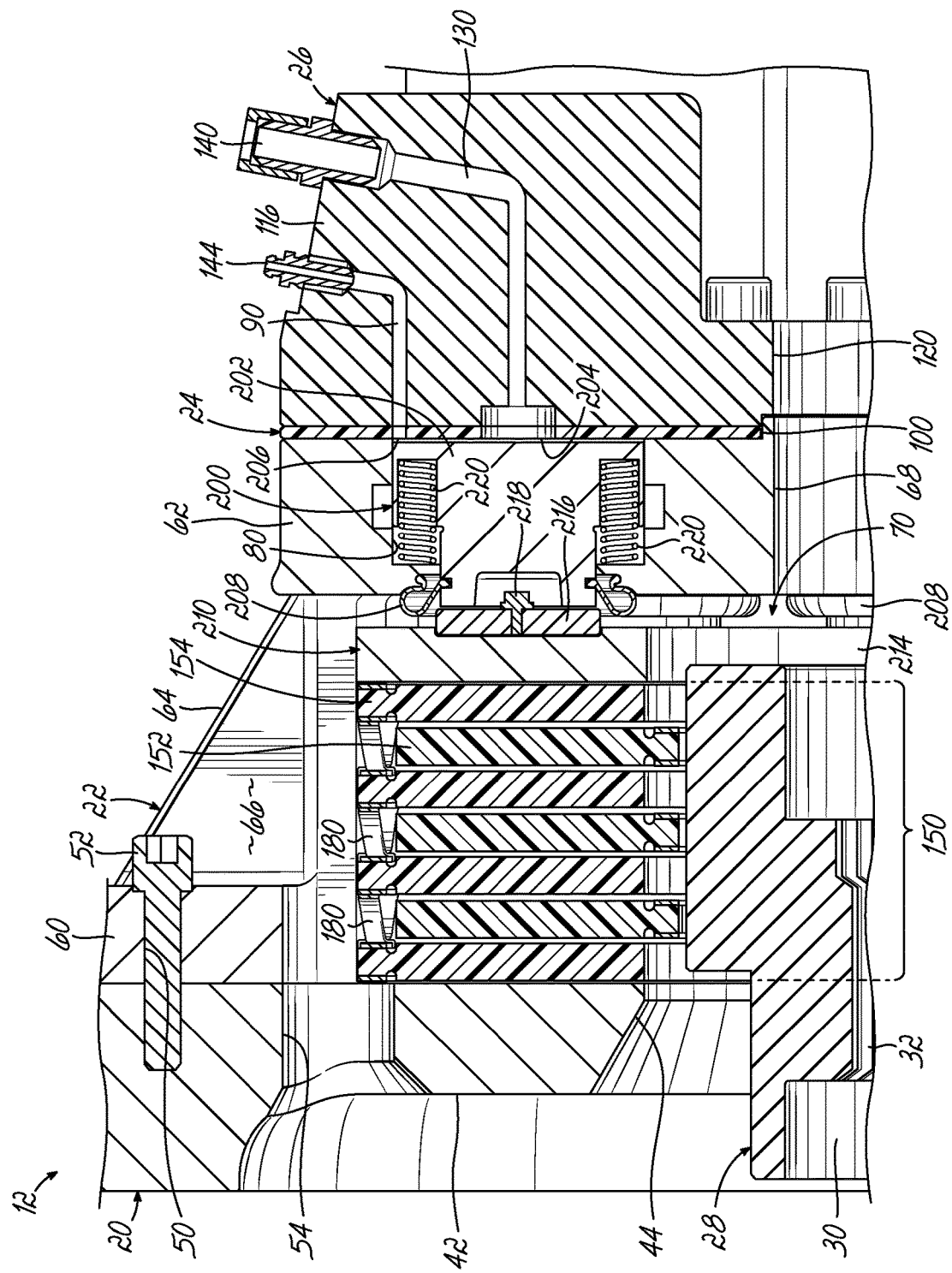
FIG. 7A is a cross sectional view taken along section line 7A-7A of FIG. 6, showing a first piston of the brake system in a retracted position.
Figure 7B:
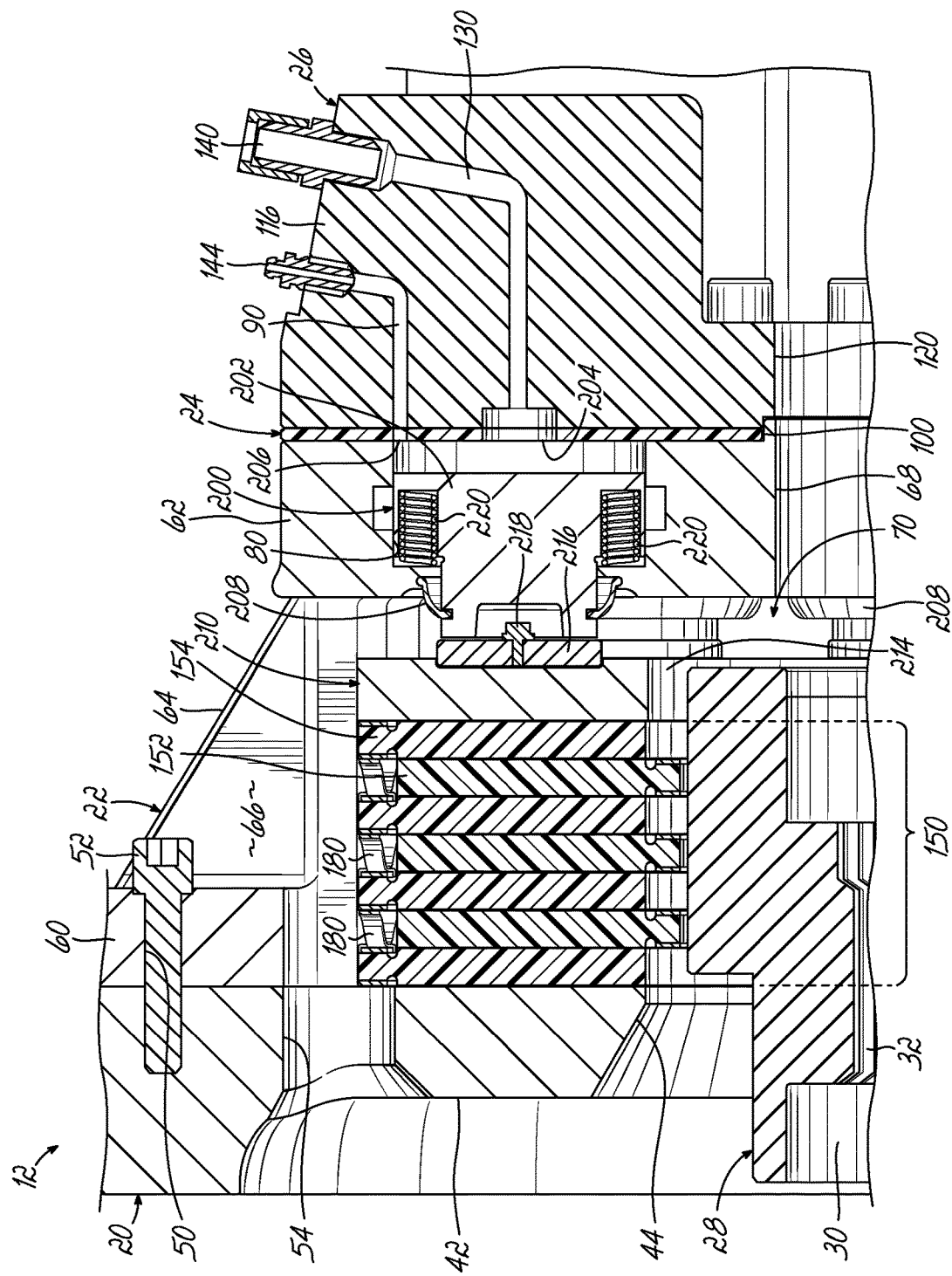
FIG. 7B is a cross sectional view similar to FIG. 7A, showing the first piston in an expanded position.

Referring now to FIGS. 6, 7A, and 7B, with continuing reference to FIG. 3, the brake system 12 includes a service brake actuator 200 which may be used to compress the rotors 152 and stators 154 together during operation of the mine truck 10. In the embodiment shown, the service brake actuator 200 includes three first pistons 202 positioned within the three first chambers 80 of the cage portion 22. First fluid inlets and outlets 204, 206 in fluid communication with the first fluid supply and bleeder pathways 130, 90, respectively, are provided on a side of each first piston 202 opposite the rotors 152 and stators 154, such that pressurization of the first chambers 80 with hydraulic fluid via the first fluid supply pathway 130 causes the first pistons 202 to expand from a retracted position (FIG. 7A) toward the rotors 152 and stators 154 to an expanded position (FIG. 7B). While not shown, it will be appreciated that pressurization of the first chambers 80 may be achieved by opening a valve via a controller, such as a brake pedal, to allow hydraulic fluid to flow from a reservoir through the first fluid supply pathway 130 to the first chambers 80. As shown, a gasket 208 may be provided between each first piston 202 and respective first chamber 80 in order to prevent hydraulic fluid leakage into the interior space 70 of the cage portion 22. In any event, when in the expanded position, the first pistons 202 may operatively engage at least one of the rotors 152 and/or stators 154 to compress or clamp the rotors 152 and stators 154 together against the platform 42 of the base portion 20 to create braking torque for resisting rotation of the shaft 16.

In the embodiment shown, a load distribution plate 210 is positioned between the first pistons 202 and the pack 150 of rotors 152 and stators 154, such that the operative engagement between the first pistons 202 and the rotor(s) 152 and/or stator(s) 154 is accomplished via the load distribution plate 210. The load distribution plate 210 may be fixed against rotation relative to the frame 14, and may be somewhat similar to a stator 154. In particular, the load distribution plate 210 may include notches 212 along its outer periphery (FIG. 3) for receiving corresponding ridges 172 of the cage portion 22, and a central bore 214 sized to clear the hub 28. In this manner, the load distribution plate 210 may provide generally even compression of the rotors 152 and stators 154 across their respective surface areas for a consistent and reliable braking torque. In addition or alternatively, thermal barrier discs 216 may be coupled to the first pistons 202 via fasteners, such as threaded bolts 218, in order to insulate the first pistons 202 and chambers 80 from the heat generated during the creation of braking torque.

As shown, pluralities of springs 220 are provided between each of the first pistons 202 and surfaces of the respective first chambers 80 on a same side of the first pistons 202 as the rotors 152 and stators 154 in order to bias the first pistons 202 away from the rotors 152 and stators 154. Thus, a threshold pressurization of the first chambers 80 may be required to overcome the bias of the springs 220 in order to expand the first pistons 202 toward the rotors 152 and stators 154. This may prevent the first pistons 202 from inadvertently compressing the rotors 152 and stators 154 together, and these springs 220 provide residual pressure to allow operation of a hydraulic slack adjuster to adjust piston stroke for ideal application delay based on friction wear. When the first chambers 80 are depressurized, such as by reducing or stopping fluid flow in the first fluid supply pathway 130 and allowing pressure to exit through the first fluid inlet 204, the first pistons 202 may be urged by the springs 220 away from the rotors 152 and stators 154, and the flat springs 180 may urge the stators 154 away from each other to unclamp the rotors 152 and cease creating braking torque.

Figure 8A:
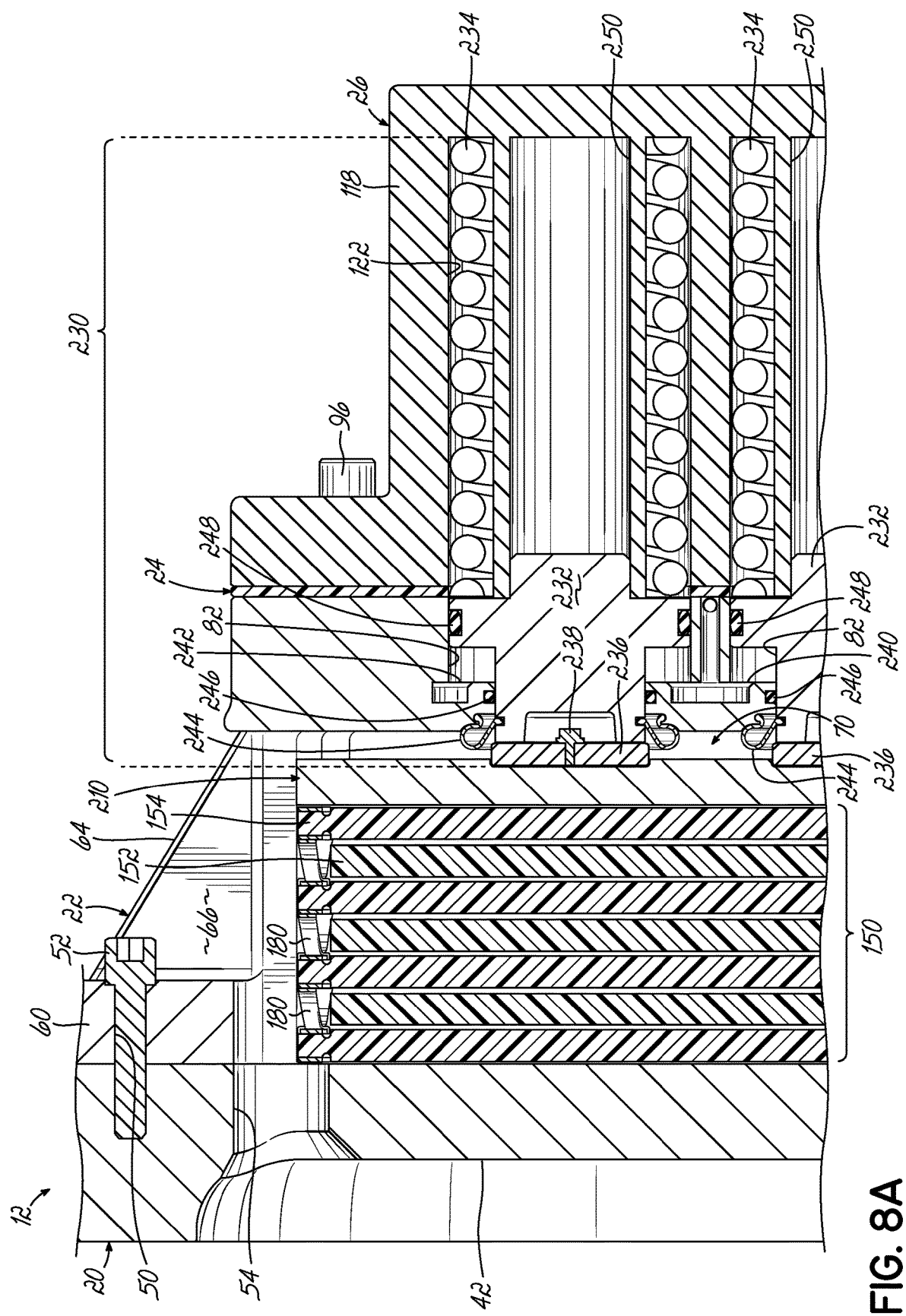
FIG. 8A is a cross sectional view taken along section line 8A-8A of FIG. 6, showing a second piston of the brake system in a retracted position.
Figure 8B:
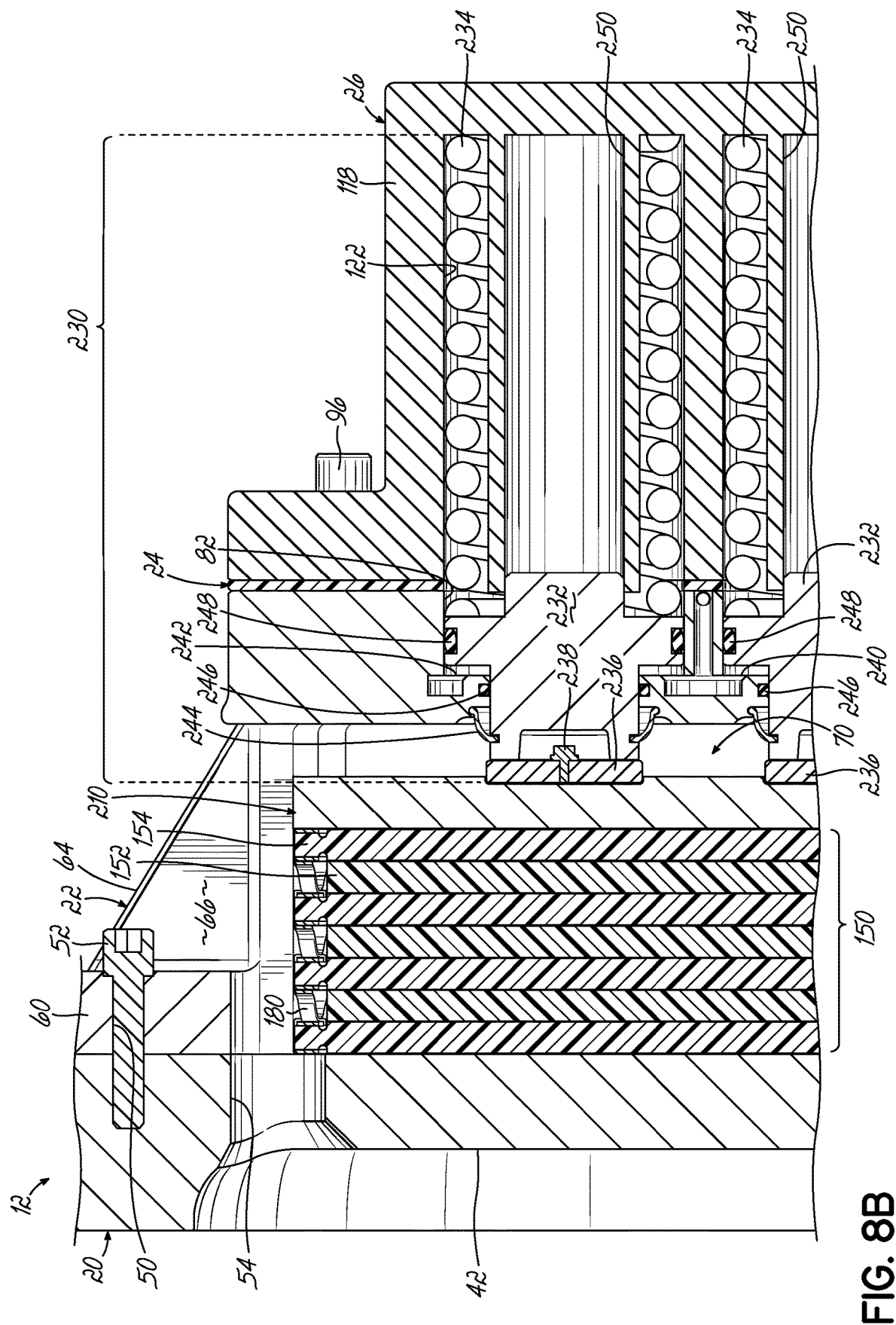
FIG. 8B is a cross sectional view similar to FIG. 8A, showing the second piston in an extended position.

Referring now to FIGS. 8A and 8B, with continuing reference to FIGS. 3 and 6, the brake system 12 further includes an emergency or parking brake actuator 230 which may be used to compress the rotors 152 and stators 154 together during operation of the mine truck 10, such as in an emergency situation, or when the mine truck 10 is out of use. In one embodiment, the parking brake actuator 230 may include a spring-applied hydraulic-released (SAHR) brake. As shown, the parking brake actuator 230 includes six second pistons 232 positioned within six corresponding second chambers 82 of the cage portion 22, and six springs 234 positioned over the second pistons 232 within blind bores 122 of the three corresponding towers 118 in order to bias the second pistons 232 toward the rotors 152 and stators 154. In this manner, the second pistons 232 may operatively engage at least one of the rotors 152 and/or stators 154 to compress or clamp the rotors 152 and stators 154 together against the platform 42 of the base portion 20 to create braking torque for resisting rotation of the shaft 16.

In the embodiment shown, the load distribution plate 210 is positioned between the second pistons 232 and the series of rotors 152 and stators 154 in a manner similar to that discussed above with respect to the service brake actuator 200. In addition or alternatively, thermal barrier discs 236 may be coupled to the second pistons 232 via fasteners 238 in order to insulate the second pistons 232 and chambers 82 from the heat generated during the creation of braking torque.

Second fluid inlets and outlets 240, 242 in fluid communication with the second fluid supply and bleeder pathways 132, 92, respectively, are provided on a same side of each second piston 232 as the rotors 152 and stators 154, such that pressurization of the second chambers 82 with hydraulic fluid via the second fluid pathway 132 sufficient to overcome the bias of the springs 234 causes the second pistons 232 to expand away from the rotors 152 and stators 154 into a retracted position relative to the rotors and stators. During normal operation of the mine truck 10, the second chambers 82 may be pressurized to maintain the second pistons 232 expanded so they are in the retracted position (FIG. 8A) to prevent the second pistons 232 from inadvertently compressing the rotors 152 and stators 154 together. When parking the mine truck 10 or during an emergency situation, the second chambers 82 may be depressurized, allowing the springs 234 to urge or expand the second pistons 232 toward the rotors 152 and stators 154 to an extended position to act on the rotors and stators and create braking torque (FIG. 8B). While not shown, it will be appreciated that depressurization of the second chambers 82 may be achieved by closing a valve via a controller, such as a parking brake lever, to slow or prevent hydraulic fluid flow from a reservoir through the second fluid supply pathway 132 to the second chambers 82. As shown, gaskets 244 may be provided between each second piston 232 and respective second chamber 82 in order to prevent hydraulic fluid leakage into the interior space 70 of the cage portion 22. In addition or alternatively, one or more O-rings 246, 248 may be provided between each second piston 232 and respective chamber 82 to provide a fluid-tight seal therebetween.

In the embodiment shown, columns 250 are provided within each blind bore 122 of the towers 118 and are generally concentric with the respective springs 234. The outer surfaces of the columns 250 may provide centering for the springs 234 and guide the springs 234 during compression and/or expansion thereof. In addition or alternatively, the columns 250 may be at least partially hollow, and the inner surfaces of the columns 250 may guide the second pistons 232 during retraction and/or expansion thereof. The end surfaces of the columns 250 proximate to the respective second pistons 232 may limit the expansion of the second pistons 232 to stop the second pistons 232 before the springs 234 become over-compressed and/or damaged.

Thus, the brake system 12 may provide improved braking performance with many of the advantages of a wet brake while avoiding many of the disadvantages of a wet brake. For example, the brake system 12 may exhibit a low wear rate, and thus a long life. The absence of oil in the interior space 70 of the cage portion 22 and/or on the rotors 152 and stators 154 avoids the parasitic drag caused by oil in wet brakes, and further avoids the need for complex and heavy oil circulation equipment.

Figure 9:
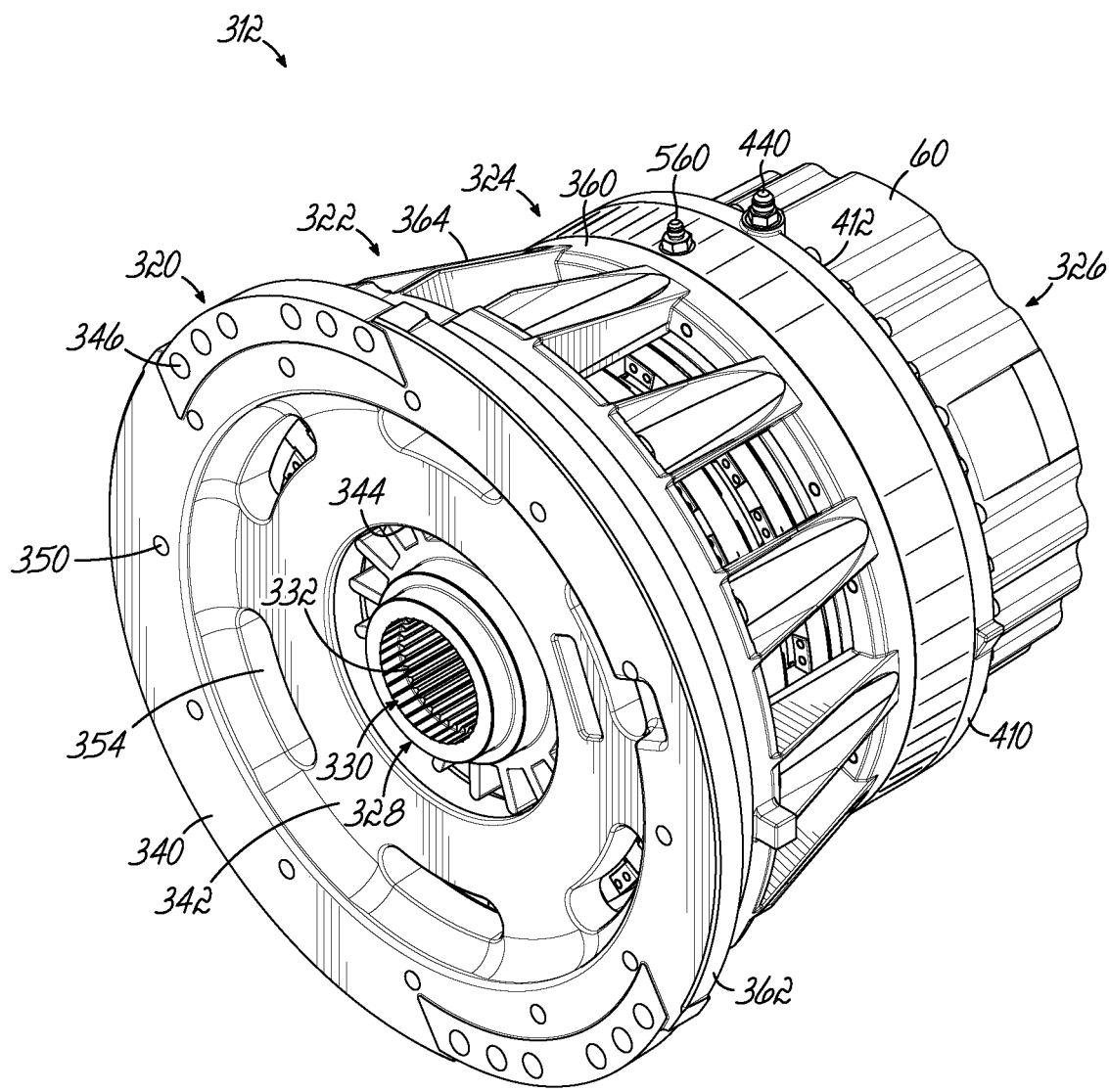
FIG. 9 is a perspective view of another exemplary brake system in accordance with the principles of the present invention.
Figure 10:
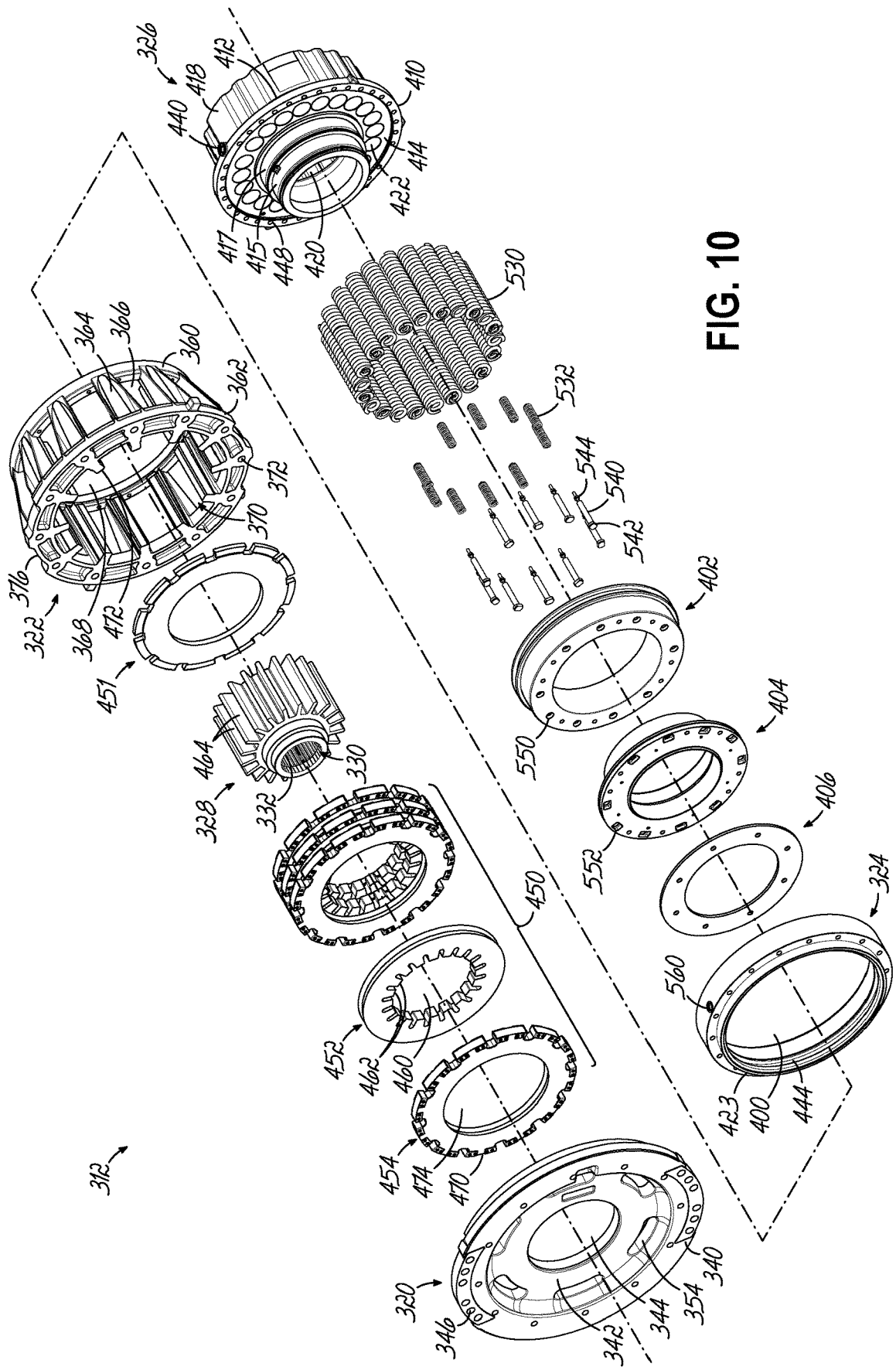
FIG. 10 is an exploded view of the brake system of FIG. 9.

Referring now to FIGS. 9 and 10, an alternative brake system 312 is illustrated. The brake system 312 is mounted to operate with a vehicle generally similarly to brake system 12 and couples with the frame and shaft, such as an axle or spindle for providing braking function for the vehicle. As noted herein and set forth in greater detail below, various components of the brake system 312 are operatively coupled to the frame 14 and/or to the shaft 16 for providing resistance to rotation of the shaft 16 and wheel 18, and thus to movement of the mine truck 10. System 312 provides both a parking brake (or emergency brake) function and a service brake function.

Referring to FIG. 9 the brake system 312 includes a base portion 320, a cage portion 322, a gland ring 324, and a cap portion 326 fixedly coupled together to form a housing and configured to be mounted to the frame 14 of the mine truck 10, as well as a hub 328 configured to be mounted to the shaft 16. To that end, the hub 328 includes a central bore 330 having splines 332 for mechanically engaging corresponding splines of the shaft 16 such that the hub 328 may rotate with rotation of the shaft 16 as discussed above. The various housing elements and hub 328 seat together as illustrated in FIG. 10.

Referring to FIG. 10 and an exploded view of system 312, the illustrated base portion 320 includes a generally annular plate 340 and a generally annular platform 342 extending from the plate 340 toward the cage portion 322 and defining a central bore 344 for receiving the shaft 16 of the mine truck 10. The base portion 320 is configured to be operatively coupled to the frame 14 of the mine truck 10 so as to be fixed against movement relative to the frame 14. To that end, the illustrated base portion 320 includes a plurality of throughbores 346 provided in the plate 340 for receiving appropriate fasteners, such as threaded bolts, to couple the base portion 320 to the frame 14. Notches (not shown) may be provided in the periphery of the platform 342 for accommodating the heads of the threaded bolts. The illustrated base portion 320 also includes a plurality of threaded blind bores 350 provided in the platform 342 for threadably receiving fasteners, such as threaded bolts 352, to couple the cage portion 322 to the base portion 320. (See FIG. 12A.) As shown, the platform 342 may include a plurality of air flow slots 354 at or near its periphery, for reasons discussed below.

Figure 12A:
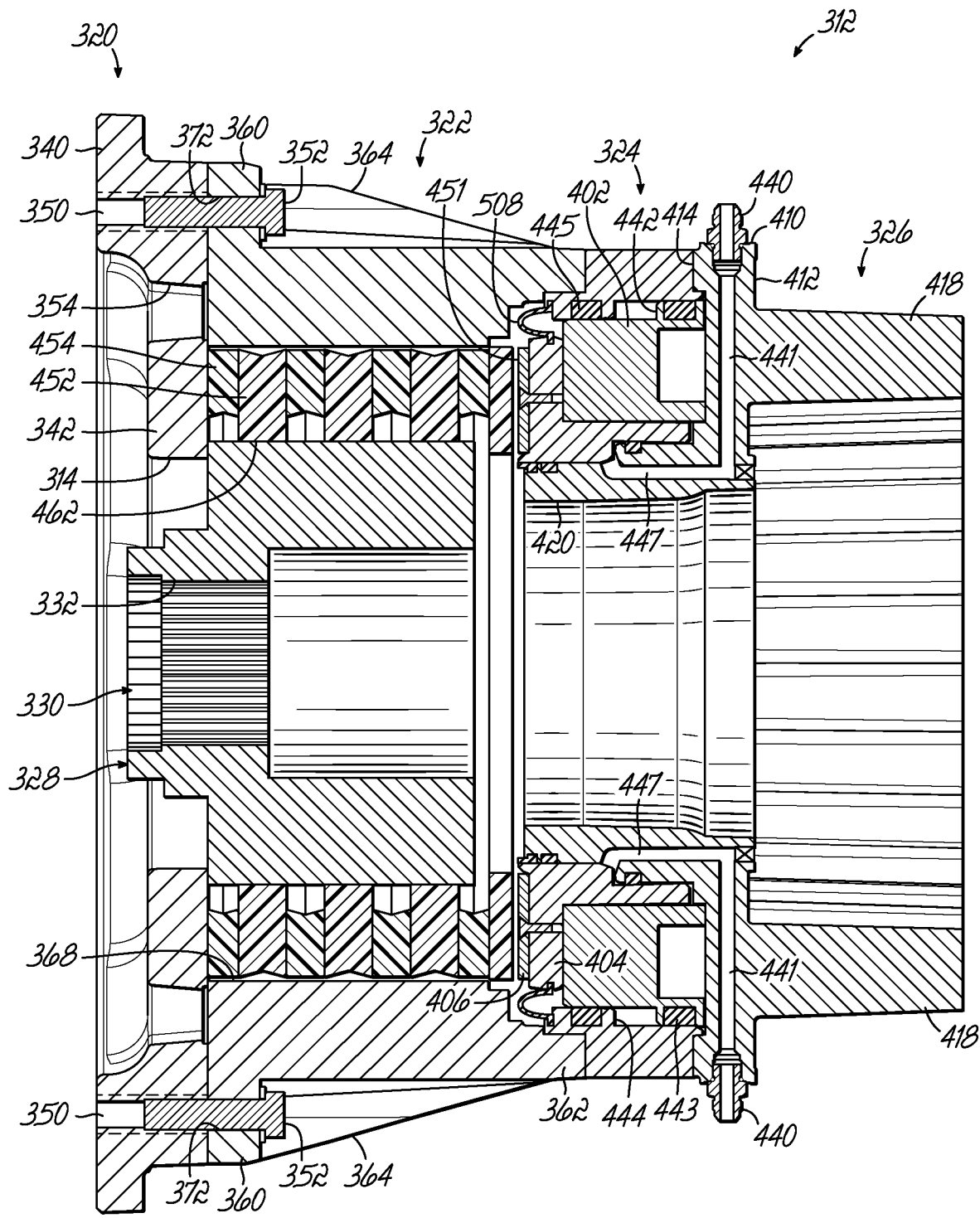
FIG. 12A is a cross sectional view showing the nested brake piston and service piston of the brake system in a retracted position and moved away from the rotors and stators for the service braking function.

The illustrated cage portion 322 includes a lower ring 360 and an upper body 362 spaced apart and coupled together by a plurality of supports 364 separated from each other by openings 366. The upper body 362 is generally annular and defines a central bore 368 for alignment with the central bore 344 of the base portion 320 and in order to receive the shaft 16 of the mine truck 10. Together, the lower ring 360, upper body 362, and supports 364 define a generally interior space 370 for receiving the hub 328 and/or other components, which may be at least partially enclosed on the side adjacent the lower ring 360 by the platform 342 of the base portion 320. To that end, the lower ring 360 of the cage portion 322 includes a plurality of through-bores 372 for receiving the threaded bolts 352 for coupling with the base portion 320. As shown in FIG. 12A for example, a portion of the through-bores 372 extend through the supports 364, for receiving the threaded bolts 352 which couple the cage portion 322 to the base portion 320. In addition or alternatively, notches 376 may be provided in the periphery of the lower ring 360 for accommodating the heads of the threaded bolts which couple the base portion 320 to the frame 14.

As shown, the gland ring 324 is generally circular and also defines a central bore 400 for alignment with the central bores 344, 368 of the base and cage portions 320, 322 in order to receive the hub 328 and shaft 16 of the mine truck 10. The base portion, cage portion, gland ring and cap portion 326 bolt together to form the housing to contain the hub, rotors and stators and pistons and other elements of the brake system 312. The gland ring 324 operates with the parking piston and service piston and seals the piston elements as discussed herein for channeling pressurized fluid providing activation of the service piston and parking piston for braking in accordance with the invention.

In accordance with one feature of the invention as set forth In the embodiment of FIGS. 9-10, a single round or annular service piston 404 and a single round or annular parking piston 402 are used for the application of braking forces. Each of the pistons 402, 404 is a unitary structure that extends continuously around the rotors and stators and is capable of continuously engaging around the series of rotors and stators to compress them and create the desired braking torque. The service piston 404 and parking piston 402 are nested together and work together for providing the parking braking function but operate apart from each other for providing the service braking function as described herein. A facing plate or thermal plate 406 is coupled to the front of the service piston, and as explained herein, the single nested annular service piston 404 and the single annular parking piston 402 both act on the series or stack of rotors and stators through the thermal plate 406.

Figure 12B:
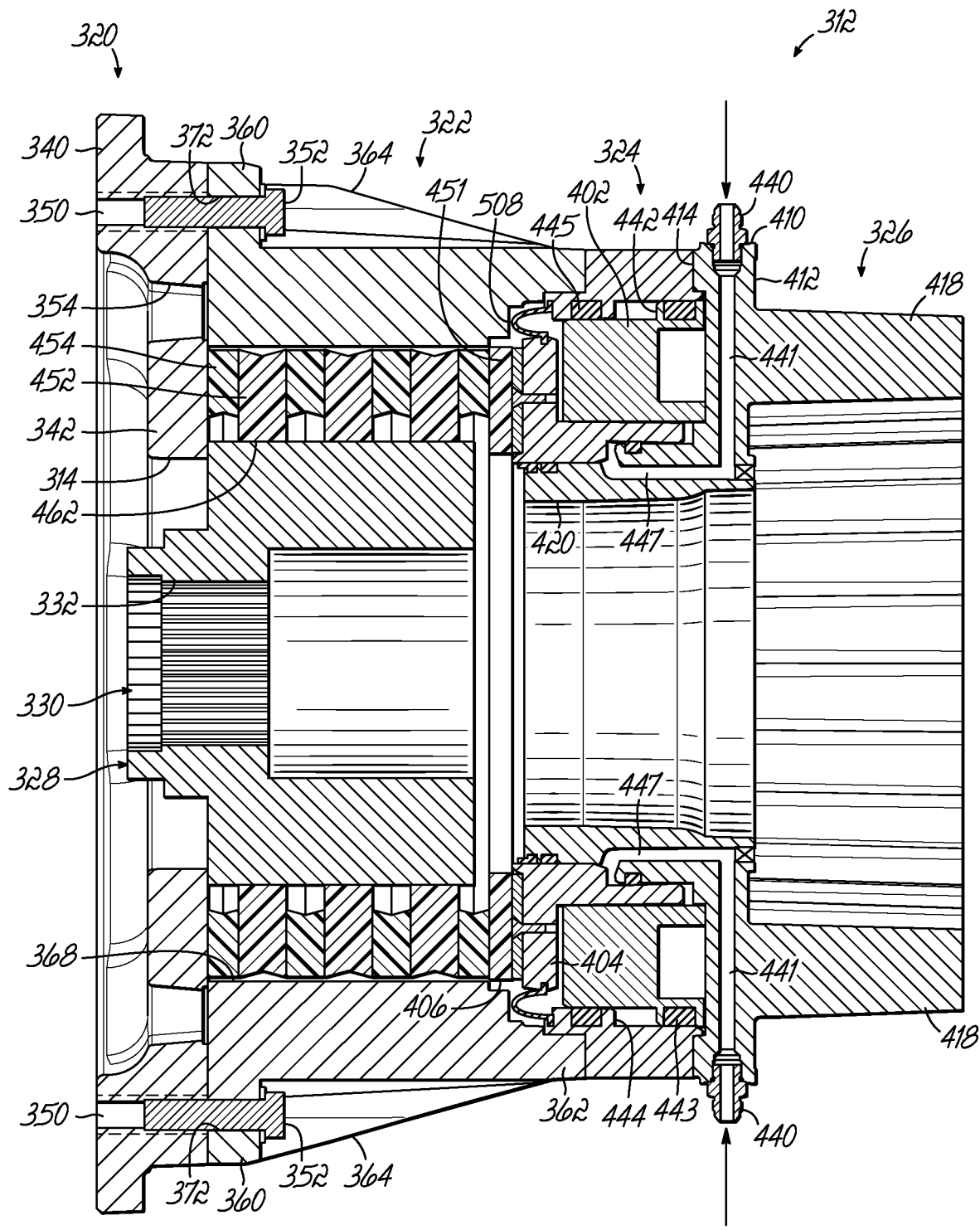
FIG. 12B is a cross sectional view similar to FIG. 12A, showing the service piston in an extended position separated from the parking piston for contacting the rotors and stators for the service braking function.

The illustrated cap portion or caps 326 includes a generally annular plate 410 having first and second surfaces 412, 414 and pluralities of towers 418 extending from the second surface 414 away from the cage portion 322. The plate 410 defines a central bore 420 for alignment with the central bores 344, 368 of the base portion 320, cage portion 322, and gland ring 324, in order to receive the shaft 16 of the mine truck 10. A plurality of blind bores 422 extend from the first surface 412 of the plate 410 and extend into each of the towers 418. Hydraulic fluid inlet ports 440 are provided in the cap 326 and fluidically communicate with the service piston 404 through fluid supply pathways 441 formed internally in the cap 326 as shown in FIGS. 12A, 12B respectively. As discussed herein and referring to FIG. 12A, the service piston 404 nests with the parking piston 402 and they are generally kept nested under a spring bias. The annular service piston is positioned to extend continuously around the rotors and stators stack. Pressurization of fluid in the service brake system acts on the service piston opposite the series of rotors and stators for continuous engagement around that series so they are compressed together. Fluid directed to the service piston 404 through the ports 440 is directed to an area or chamber around the piston and to a surface on a rear side or surface of the service piston that is oriented opposite the series of rotors and stators to then drive the piston 404 to an expanded position forwardly toward and against the rotor/stator stack for the service braking function. As shown in FIG. 10, the cap 326 includes a plurality of through bores 448 provided in the plate 410 for receiving appropriate fasteners, such as threaded bolts and/or threaded studs (not shown) which couple the cap 326 to the gland ring 324 and/or cage portion 322.

Referring now to FIG. 10, with reference to FIGS. 12A, 12B, 12C and 13A, 13B, 13C the brake system 312 includes a series or stack 450 of generally disc-shaped rotors 452 and stators 454 housed within the interior space 370 of the cage portion 322. The rotors 452 are operatively coupled to the shaft 16 and configured to rotate with the shaft 16 relative to the frame 14. To that end, the rotors 452 each include a central bore 460 having a plurality of keys 462 configured to be received by corresponding keyways 464 of the hub 328. When the shaft 16 and hub 328 rotate together, the keyways 464 may mechanically engage the corresponding keys 462, thereby causing the rotors 452 to rotate with the hub 328 and shaft 16. It will be appreciated that the rotors 452 may be coupled to the shaft 16 in various other ways without departing from the scope of the invention.

The stators 454 are operatively coupled to the frame 14 and configured to be fixed against rotation relative to the frame 14. To that end, the stators 454 each include notches 470 along their outer peripheries for receiving corresponding ridges 472 of the cage portion 322, and a central bore 474 sized to clear the hub 328. In this manner, when the shaft 16 rotates, the engagement between the ridges 472 and the notches 470 may prevent the stators 454 from rotating relative to the frame 14, while the hub 328 and/or shaft 16 may rotate freely within the central bore 474. In the embodiment shown, the ridges 472 are provided on inner surfaces of the supports 364 of the cage portion 322. It will be appreciated that the stators 454 may be coupled to the frame 14 in various other ways without departing from the scope of the invention.

The rotors 452 and stators 454 are free to move slightly along the axis of the shaft 16 such that, when the rotors 452 and stators 454 are spaced apart from each other, the rotors 452 are permitted to rotate freely with the shaft 16 and such that, when the rotors 452 and stators 454 are compressed or clamped together, braking torque may be created by friction generated between the compressed rotors 452 and stators 454 to thereby resist rotation of the rotors 152. In that regard, each of the rotors 452 and/or stators 454 may be constructed of a friction material suitable for braking applications. For example, the rotors 452 and/or stators 454 may comprise monolithic pieces of carbon fiber reinforcement in a matrix of carbon, commonly referred to as carbon fiber-reinforced carbon or carbon-carbon. It will be appreciated that carbon-carbon may exhibit a low wear rate and thus provide durability to the rotors 452 and stators 454, and that a monolithic construction may allow a substantial portion of the thickness of each rotor 452 and stator 454 to be available as usable material during braking. However, any other suitable material and/or suitable construction (e.g., non-monolithic) may be used for the rotors 452 and/or stators 454. For example, the rotors 452 and/or stators 454 may include a sintered metallic-based friction material bonded to both sides of a steel core or manufactured into a monolithic piece. In one embodiment, the pluralities of rotors 452 and stators 454 are configured to be free from oil flow during use. In any event, the braking torque created by compressing the rotors 452 and stators 454 may be transferred from the rotors 452 to the hub 328 via the keys 462 and keyways 464, and may be transferred from the hub 328 to the shaft 16 via the splines 332 to resist rotation of the shaft 16 and wheel 18.

It will be appreciated that substantial heat may be generated during the creation of braking torque by the rotors 452 and stators 454. The air flow slots 354 in the platform 342 of the base portion 320 may assist in transferring such heat away from the brake system 312. In addition or alternatively, the openings 366 between the supports 364 of the cage portion 322 may assist in transferring the heat away from the brake system 312.

As shown with other embodiments, generally flat springs may be positioned between adjacent stators 454 at or near their peripheries to bias the stators 454 away from each other and thereby prevent the stators 454 from inadvertently clamping a rotor 452 therebetween when braking torque is not desired, which would lead to parasitic drag. The flat springs may be coupled to peripheral metallic clips as discussed herein. In the embodiment shown, rotors 452 and stators 454 are arranged in an alternating sequence starting and ending with a stator 454. Various numbers of rotors and stators may be arranged in any suitable sequence. For example, in one embodiment, each front wheel of the mine truck may be equipped with a brake system having a greater number of rotors and stators than the brake systems of the rear wheels due to reduced torque requirements for the rear wheels, such as when the rear brake systems operate behind a gear box.

Figure 11:
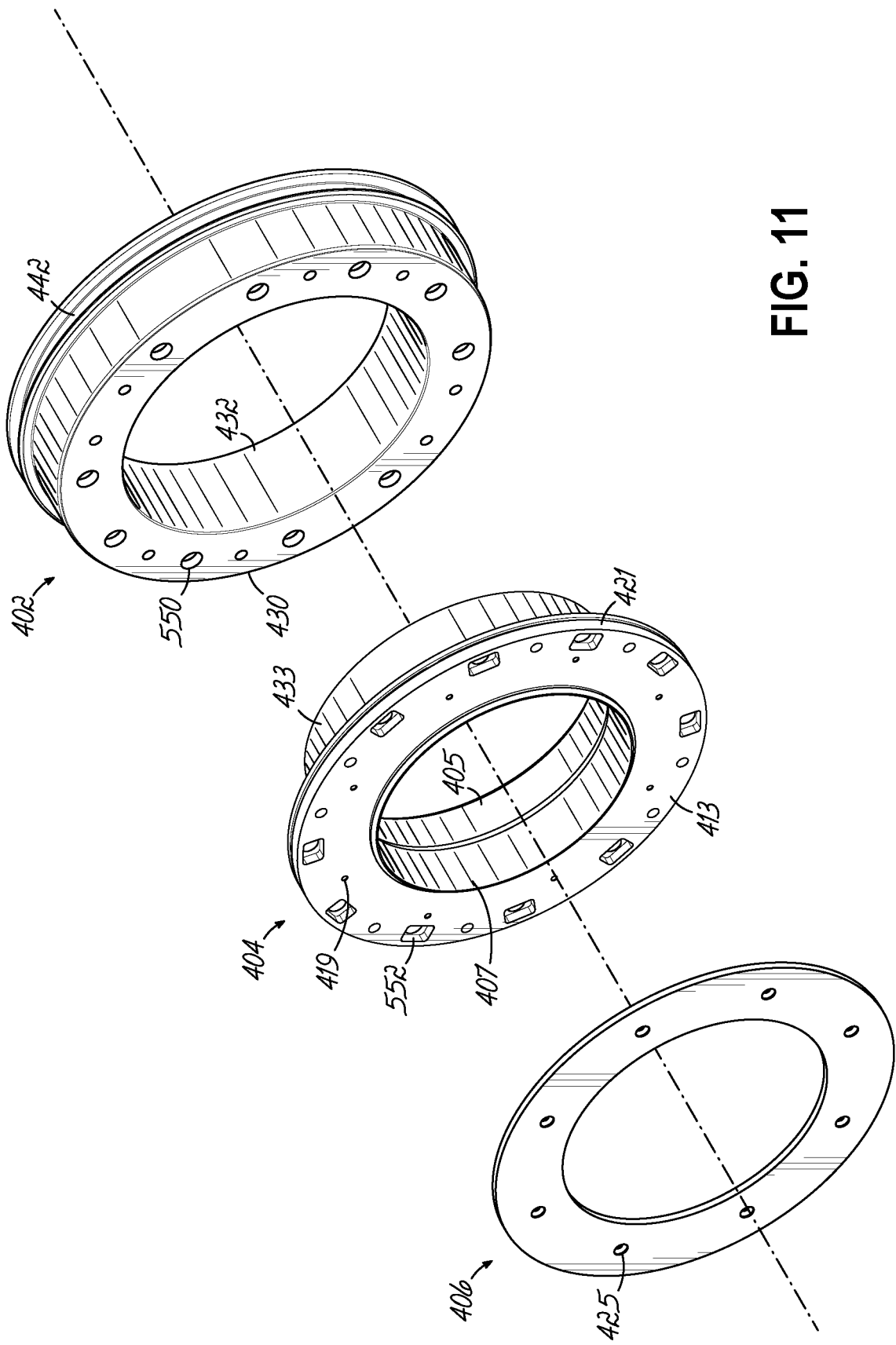
FIG. 11 is a partial exploded view of the brake system of FIG. 2, showing various piston features of the brake system.

Turning to FIG. 11, the parking piston 402 is illustrated in line with the service piston 404 and thermal plate 406. In accordance with the features of the invention, the braking force is not provided by a plurality of individual pistons that act on the rotor/stator stack at discreet points around the stack and around the axle. Rather, each of the service piston and parking piston are unitary and annular elements that are round or annular in shape and that encircle the axle and stack. The annular pistons extend continuously around the stack 450 and when pressurized or spring biased for engagement, the pistons act to continuously engage around the series or stack of rotors and stators to provide a continuous braking force around the wheel. That is, when the service piston 404 and parking piston 402 are actuated, they apply a force continuously around the stack. Also, in accordance with another feature of the invention, the two pistons 402, 404 nest with each other and together with thermal plate 406 provide a movable braking mechanism for facilitating both parking or emergency braking and selectable service braking. The braking mechanism as shown in FIG. 11, acts against a load plate 451 as shown in FIG. 10.

The nesting annular parking piston 402 and annular service piston 404 act together in the application of braking force for parking or in an emergency. As seen in FIG. 12A, the service piston 404 is positioned between the parking piston 402 and the stack of rotors and stators and so when a braking force is applied to the parking piston 402, it is also applied to the nested service piston 404 and then onto the stack of rotors and stators through the load plate 451. As discussed herein, the service piston 404 and parking piston 402 are held nested together by a spring bias. So during the application of a parking brake function, they remain nested and apply the braking force together in an annular and continuous fashion around the stack and around the axle. However, when a service braking force is applied, the service piston is separated from the parking piston in order to selectively apply a service braking force. More specifically, fluid pressure is directed to the service piston 404 to overcome the spring bias so as to move it forward and separate it from the parking piston 402. For service braking, the braking force is only applied by the service piston when the parking braking function is released.

As with other embodiments disclosed herein, the parking piston 402 is spring biased in an engaged or actuated position to provide the parking braking function. Because of the biased nesting of the parking piston 402 and service piston 404, the service piston 404 is also in a spring biased engaged or actuated position for parking braking. That is, the pistons 402, 404 provide the parking braking function together. The parking piston in an extended position pushes the nested service piston which, in turn, acts on the rotor and stator stack. Then, through the selective application of fluid pressure, the parking piston 402 is expanded, and along with the nested service piston 404, the pistons are retracted or deactuated together to release the parking brake function. When the parking piston 402 is deactuated, the service piston 404 is then free to be selectively expanded and actuated to separate it from the parking piston 402 and provide its own service braking function independent of the parking piston 402.

Figure 12C:
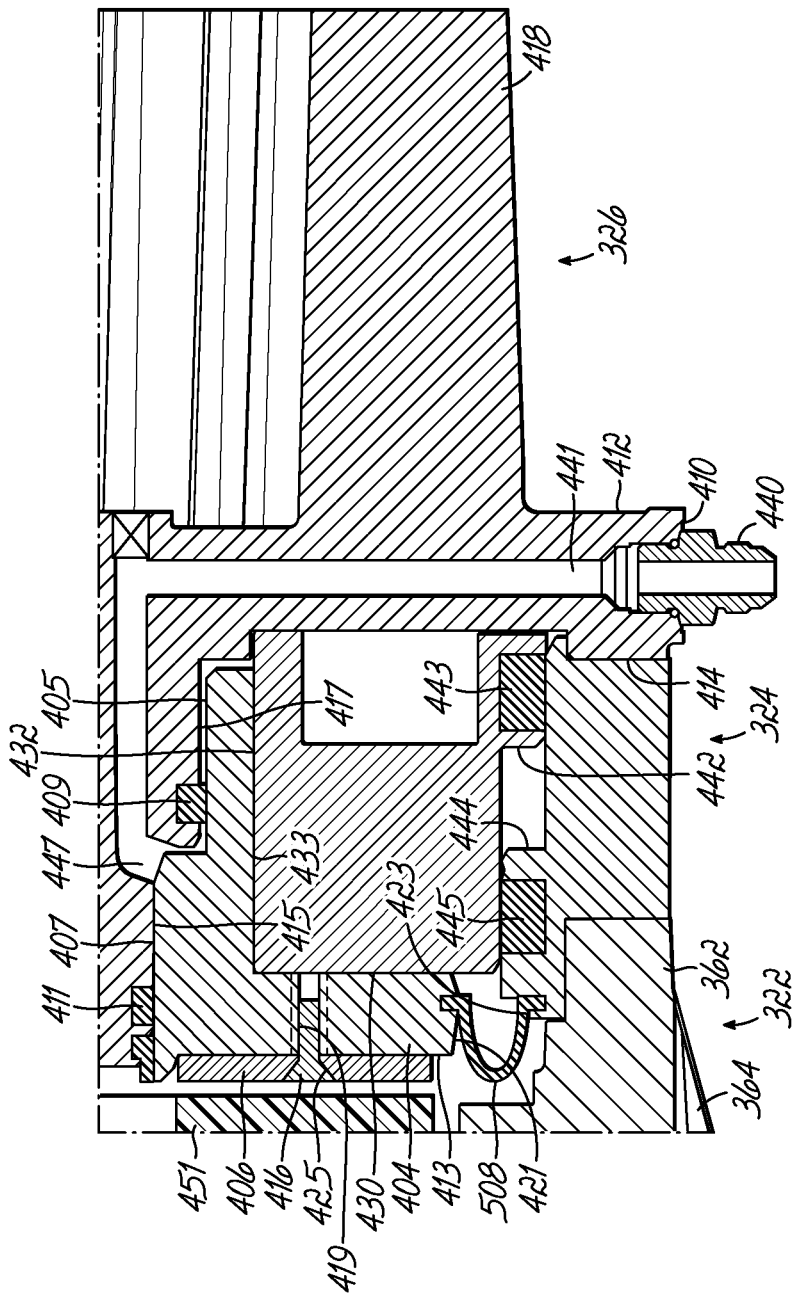
FIG. 12C is a cut-away, cross-sectional view as in FIG. 12A showing the service brake system.

More specifically, referring to FIG. 12A, the service piston 404 is shown nested against the parking piston 402. The two pistons are nested inside of the gland ring 324 which seals the pistons with respect to the cap 326 and cage portion 322 and provides for the actuation and release of the parking piston 402 for applying and releasing the appropriate brake function as discussed herein. The parking piston 402 and service piston 404 are captured radially between the gland ring 324 and the cap 326 as seen in the cross-section of FIG. 12A. More specifically, the cap 326 includes stepped hub portions 415, 417 of varying outer diameter dimensions (see FIG. 10) that coincide radially with hub portions 405, 407 of the service piston 404 that have generally matching inner diameter dimensions. The seating of the service piston 404 and the cap 326 allows for a space or chamber around the service piston 404 to provide longitudinal movement of the service piston on the cap 326. Seals or gaskets 409, 411 between the cap hub portions 405, 407 ensure a fluid seal of the space so that the service piston 404 may be expanded and actuated by pressurized fluid to provide separation from the parking piston 402 and service braking functionality. Service piston 404 also includes an annular portion 413 surrounding the hub portions 405, 407 that bears on the load plate 451 through thermal plate 406 when braking is applied. Referring to FIGS. 11 and 12C, thermal plate 406 is fixed to the annular portion 413 through appropriate fasteners 416 and aligned aperture 425 and 419 in the respective plate 406 and service piston 404.

Turning again to FIGS. 11 and 12C, a boot 508 is also positioned between an outer radial edge 421 of the annular portion of service piston 404 and a radial edge 423 of the gland ring 324 (see FIG. 10) for preventing outside debris from getting into the pistons and their seals. Then, service piston seals 409, 411, as shown herein, fluidly seal the service piston 404 with respect to the gland ring 324 for being able to supply pressurized fluid against the service piston 404 for separating the service piston from the parking piston 402. The boot may be formed of a silicon elastomer. The seals 409, 411 may be formed out of polyurethane thermoplastics and rubber materials.

The parking piston 402 includes an annular portion 430 that is radially dimensioned at an inner surface 432 to fit over an outer surface 433 of the hub portions 405, 407 of the service piston as seen in FIGS. 11 and 12C. That is, the service piston hub portions 405, 407 and outer surface 433 nest radially inside of the inner surface 432 of the parking piston annular portion 430. This provides a sliding engagement between the service piston and parking piston so that service piston 404 may slide independently of the parking piston 402. Parking piston 402 then nests inside of gland ring 324 as seen in FIGS. 12A, 12C. Each of the gland ring 324 and the parking piston 402 includes a track to contain a seal for forming a fluid sealed interface between the parking piston and gland ring. More specifically, as seen in FIG. 12C, the parking piston includes an outer track or groove 442 that is configured for containing a seal 443 while the gland ring 324 includes an inner track or groove 444 that contains a seal 445. In that way, the interface between the gland ring and parking piston is sealed. The seals may preferably be formed of polyurethane thermoplastics and rubber materials and provide for sliding movement of the parking piston 402 with respect to the gland ring 324.

Figure 13A:
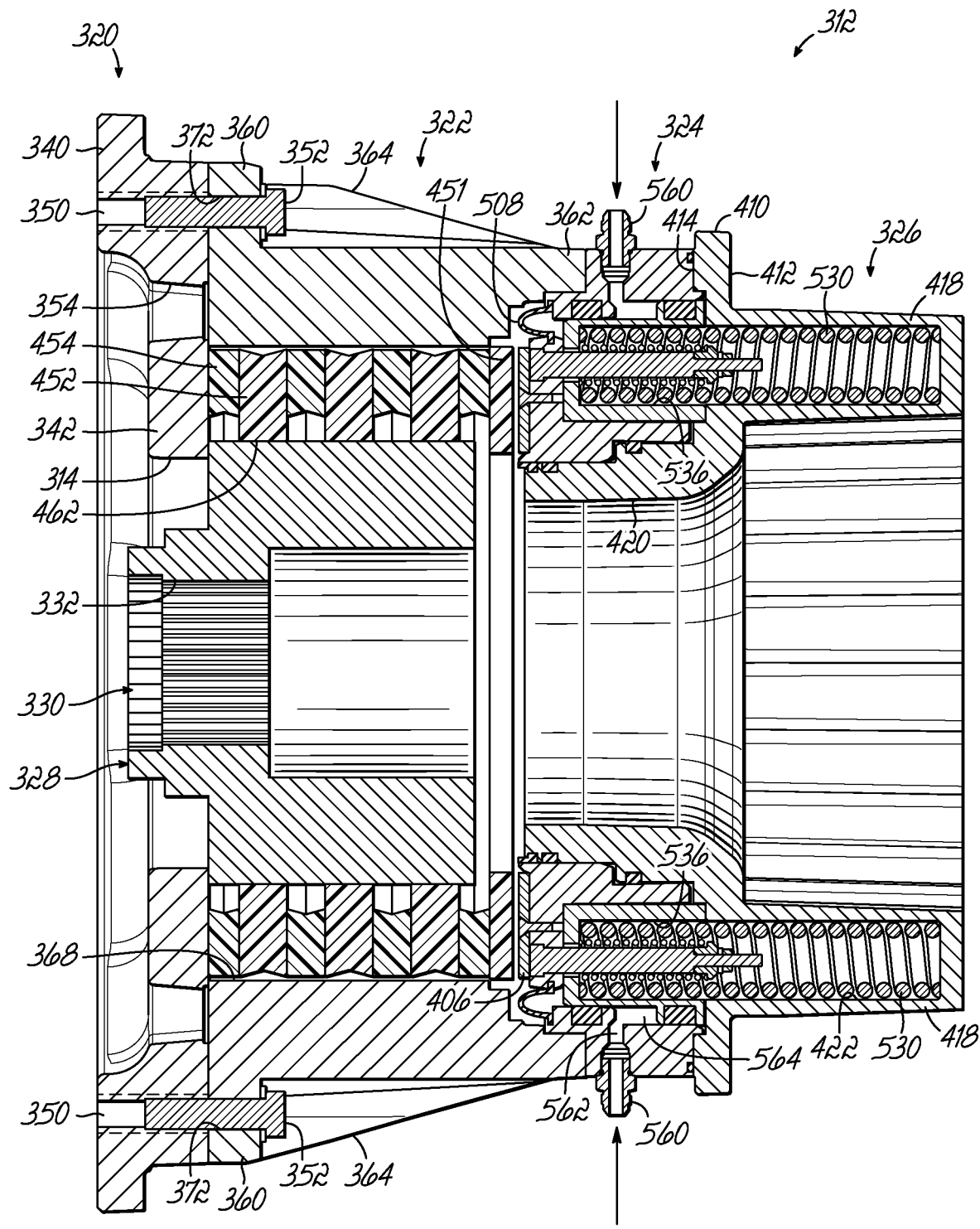
FIG. 13A is a cross sectional view, showing the nested brake piston and service piston of the brake system in a retracted position similar to FIG. 12A and moved away from the rotors and stators for the release of the parking braking function.

For biasing the parking piston 402 and service piston 404 forward for their braking functions, a spring bias force is provided. Similarly, the parking piston and service piston are coupled together with a spring bias force. For providing a parking brake or emergency brake braking force, in the disclosed embodiment, at least one, and preferably a plurality of springs 530 act to create a spring bias of the parking piston 402 and the service piston 404 to an extended position against the stack of rotors and stators. Then, to release the parking brake force, pressurized fluid actuation is provided to overcome the bias of the springs 530 and thus move or expand the nested unitary parking piston 402 and the unitary service piston 404 to a retracted position away from the stack. Referring further to FIG. 13A, the blind bores 422 of the cap 326 each receive a respective parking spring 530 in an orientation to direct the spring against a backside of the parking piston 402. The parking piston 402 has similar blind bores 536 as seen to contain ends of the springs 530 (see FIG. 13C).

Figure 13B:
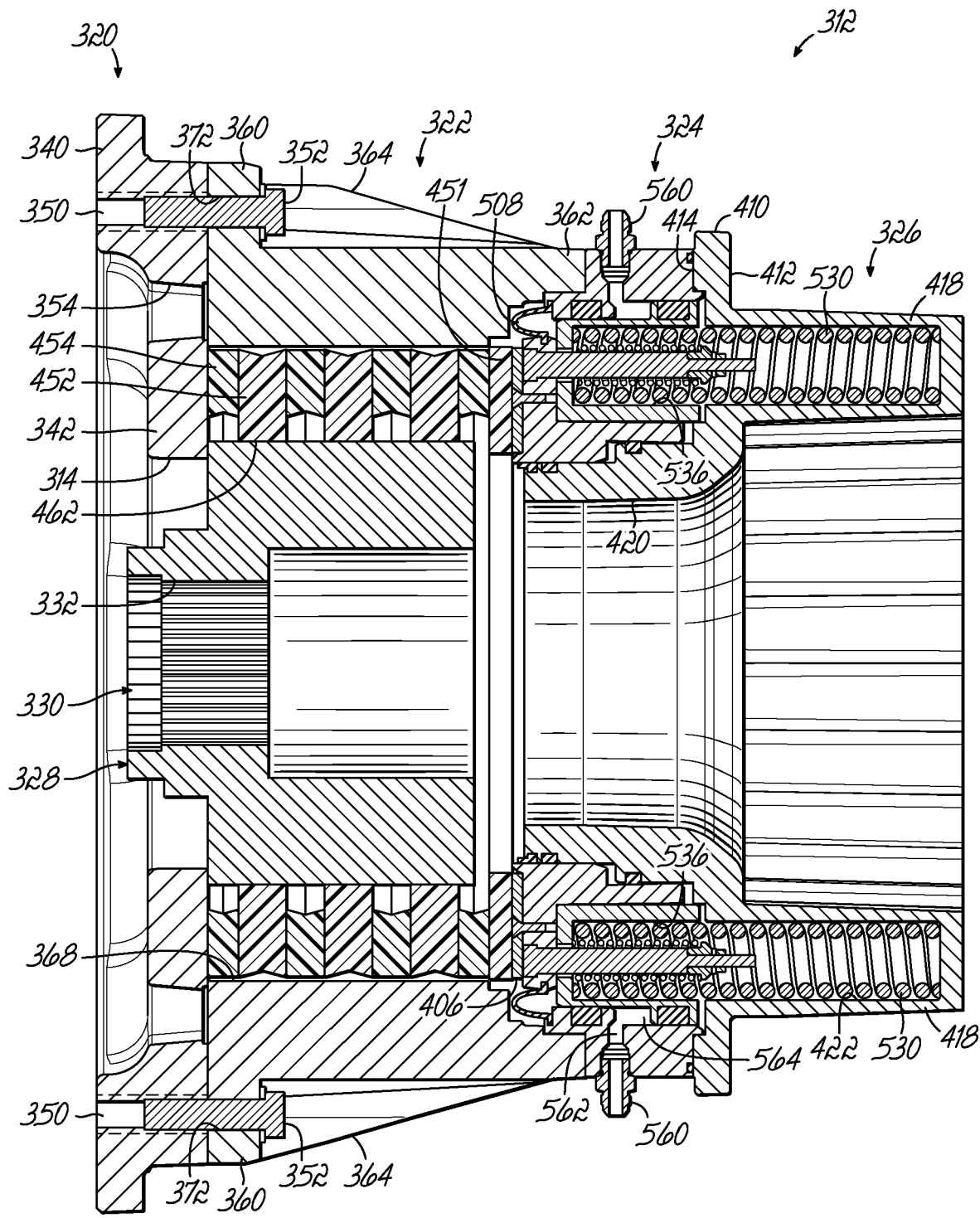
FIG. 13B is a cross sectional view similar to FIG. 13A, showing the nested brake piston and service piston of the brake system in an extended position for moving the nested brake piston and service piston toward the rotors and stators for applying the parking braking function.
Figure 13C:
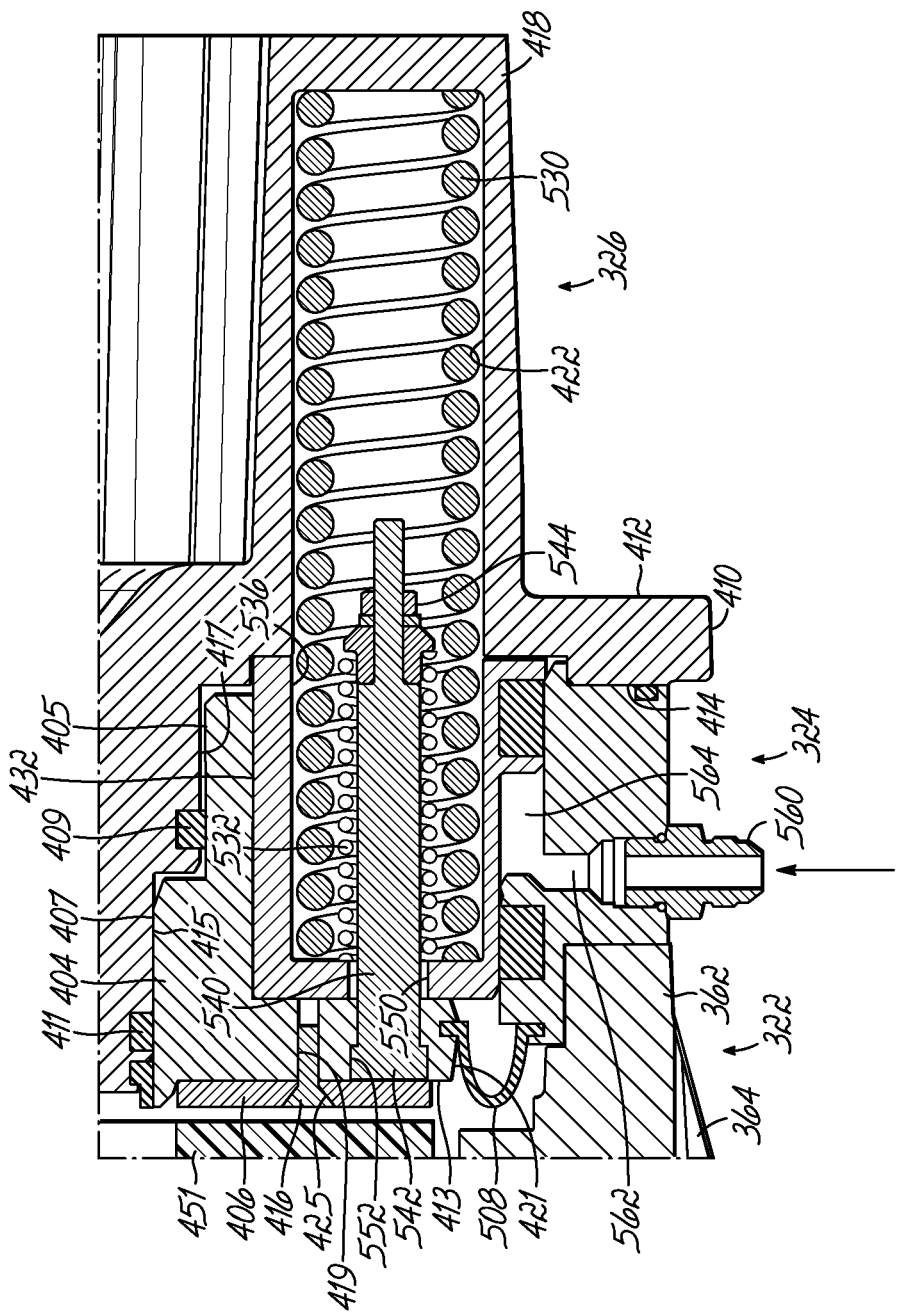
FIG. 13C is a cut-away, cross-sectional view as in FIG. 13A showing the parking brake system.

The service piston 404 is coupled with the parking piston through a spring bias force as well. Referring to FIGS. 10 and 13C, a plurality of springs 532 sit inside and coaxial with the parking springs 530. A threaded bolt or fastener 540 extends through the springs 532 and through aligned openings 550 in the parking piston 402 and openings 552 in the service piston 404 as shown in FIGS. 10 and 11. The bolts 540 each include a head 542 that is captured by the respective opening 552 in the service piston as shown in FIG. 13A, while passing through the respective opening 550 in the parking piston. The springs 532 are dimensioned in diameter to be held in the blind bores 422 and 536 of the cap 326 and parking piston 402, respectively. Specifically, a forward end of each spring 532 is captured in the blind bore 536 of the parking piston and a rearward end of each spring 532 is captured by a nut 544 that may be threaded on or otherwise secured on the end of the bolt 540 (see FIG. 13C). The springs 532 are captured on the bolt and between the service piston 404 and nut 544 in a compressed state. The springs 532 are positioned to be coaxial with springs 530. The diameter of springs 532 is larger than the openings 550 in the parking piston to contain the springs 532 against the rear of the piston 402. In that way, the head 542 of each bolt acts against the front of the service piston (with the "front" defined as facing the stack of rotors and stators) while the nut 544 and captured compressed spring 532 act against of the rear of the parking piston to bias or hold the parking piston 402 and the service piston 404 together in the blind bores 422 and 536. In that way, when a braking force is applied by springs 530 to the unitary parking piston 400, it is also applied to the unitary service piston and thus translated to and extended position or applied to the stack of rotors and stators through the load plate 451.

Referring now to FIGS. 12A and 12C, with continuing reference to FIG. 10, the brake system 312 includes a service brake actuator mechanism or system which may be used to compress the rotors 452 and stators 454 together during operation of the mine truck 10. FIG. 12A illustrates the brake system with the parking brake force released as described herein with respect to FIG. 13A. In that parking brake release state, both the unitary parking piston and unitary service piston are nested together and in a retracted position away from the rotors and stators. In the embodiment shown, the service brake actuator includes the unitary service piston 404 positioned between the cap 326 and cage portion 322 and surrounded by the gland ring 324. Hydraulic fluid inlet ports 440 are provided in the cap 326 and fluidically communicate with the service piston 404 through fluid supply pathways 441 and chambers 447 formed internally in the cap 326 as shown in FIG. 12C. The fluid supply pathways 441 and chambers 447 are provided on a rear or back side or surface of each service piston 404 or on a side that is opposite the rotors 452 and stators 454. In that way, pressurization with hydraulic fluid via the fluid supply pathway 441 that is provided in the space between hub portions 415, 417 of the cap 326 and the gland ring 324 that contains the service piston and parking piston causes the unitary service piston 404 to expand from a retracted position nested with parking piston 402 (FIG. 12A) to an expanded or extended position (FIG. 12B) and toward the rotors 452 and stators 454, such that the service piston is separated from the parking piston. As shown in FIG. 12B, the extended service piston separates from the parking piston.

While not shown, it will be appreciated that pressurization of the space holding the service piston between the cap hub portions 415, 417 and the parking piston 402 may be achieved by opening a valve via a controller, such as a brake pedal, to allow hydraulic fluid to flow from a reservoir through the fluid supply pathway 441 to the space 447 to act on the service piston 404. As shown, 409, 411 and the gasket 508 between the gland ring 324 and service piston 404 ensure a fluid seal for the service piston so that the service piston 404 may be actuated to provide separation from the parking piston 402 and thus provide service braking functionality. The seals 409, 411 may be formed out of polyurethane thermoplastics and rubber materials. In any event, when in the expanded position, the unitary service piston 404 may operatively engage at least one of the rotors 442 and/or stators 454 through the load plate 451 to compress or clamp the rotors and stators together against the platform 342 of the base portion 320 to create braking torque for resisting rotation of the shaft 16. FIG. 12B illustrates the separation of the unitary parking piston 402 and the unitary service piston 404 and contact with the rotor and stator stack to provide the service braking force.

In the embodiment shown, the load distribution plate 451 is positioned between the service piston 404 and the pack 450 of rotors 452 and stators 454, such that the operative engagement between the service piston 404 and the rotor(s) 452 and/or stator(s) 454 is accomplished via the load distribution plate 451. The load distribution plate 451 may be fixed against rotation relative to the frame 14, and may be somewhat similar to a stator 454. In particular, the load distribution plate 210 may include notches along its outer periphery (see FIG. 10) for receiving corresponding ridges 472 of the cage portion 322, and a central bore sized to clear the hub like a stator 454. In this manner, the load distribution plate 451 may provide generally even compression of the rotors 452 and stators 454 across their respective surface areas for a consistent and reliable braking torque. In addition or alternatively, the thermal plate 406 may be coupled to the service pistons 404 via fasteners, such as threaded bolts 416, and aligned aperture 425 and 419 in the respective plate 406 and service piston 404, in order to insulate the service piston 404 and space containing the service piston from the heat generated during the creation of braking forces and torque.

As shown in FIG. 12A, the combination service piston 404 and parking piston 402 are held nested together by springs 532. In FIG. 12A, the parking braking force is released or deactuated by directing pressurized fluid against the parking piston to expand the pistons against spring bias so the pistons are moved to a retracted position, as discussed herein with respect to FIGS. 13A, 13B. As such, the service piston 404 is also in the retracted position with the parking piston and there is no braking force applied to the stack 450. This may be seen in the spacing between the service piston 404 and plate 406 and the stack in FIG. 12A. Thus, a threshold pressurization of the service piston through fluid delivered through fluid supply pathways 441 is required to overcome the bias of the springs 532 and to compress the springs in order to expand the service piston 404 to an extended position away from the parking piston 402 and toward the rotors 452 and stators 454 for selective service braking. Then, when the supply pathways are depressurized, such as by reducing or stopping fluid flow and allowing pressure to exit through the fluid inlet ports 440, the service piston 404 may be urged by the springs 532 away from the rotors 452 and stators 454 to a retracted position and back into contact in the nested arrangement with the retracted and released parking piston 402. Elements such as flat springs between the stator elements may urge the stators away from each other to unclamp the rotors and cease creating braking torque.

For parking brake forces, the actuation is accomplished by depressurizing supply pathways affiliated with the parking piston 402. Referring now to FIGS. 13A-13C, with continuing reference to FIG. 10, the brake system 312 further includes an emergency or parking brake actuator mechanism or system which may be used to compress the rotors 452 and stators 454 together during operation of the mine truck 10, such as in an emergency situation, or when the mine truck 10 is out of use. In this disclosed embodiment, the parking brake actuator system includes a spring-applied hydraulic-released (SAHR) brake. As shown, the parking brake actuator system includes the unitary annular parking piston 402 that is nested with the unitary service piston 404. The one or more parking springs 530 are positioned within various corresponding blind bores 422 of the cap 326 and bores 536 of the parking piston 402 and collectively create a spring bias to bias the unitary parking piston to an extended position toward the rotors 452 and stators 454 for continuous engagement. This bias force, in turn, is also directed on the nested service piston 404 to operatively engage the load plate 451 and the stack of rotors 452 and/or stators 454 to compress or clamp the rotors and stators together against the platform 342 of the base portion 320 to create braking torque for resisting rotation of the shaft 16. That is, the spring bias of the parking piston is transferred through the service piston to rotors and stators.

In the embodiment shown, the load distribution plate 451 is positioned in a manner similar to that discussed above with respect to the service brake actuator system since the parking piston and service piston act together in the parking braking function. Similarly, the thermal plate insulates the parking piston as well as the various chambers between the hub sections 415, 417 and gland ring 324 that house the parking piston 402 from the heat generated during the creation of braking torque.

Hydraulic fluid inlet ports 560 for the parking braking function are provided in the gland ring 324 and fluidically communicate with the parking piston 402 through fluid supply pathways 562 formed internally in the gland ring 324 as shown in FIGS. 13A-13C. The fluid inlet ports 560 and supply pathways 562 in fluid communication with a suitable fluid supply, are provided to chambers 564 on a front side of the parking piston or rather on the same side of the parking piston as the rotors 452 and stators 454. More specifically, the chambers 564 for receiving fluid for the parking brake are positioned between the outer track or groove 442 of the parking piston 402 containing seal 443 and the inner track or groove 444 of the gland ring 324 containing seal 445 (See FIGS. 10 and 13C) Therefore, pressurization of chambers 564 with hydraulic fluid via the fluid inlet ports 560 and fluid supply pathways 562 acts against the track 442 and parking piston 402 with a sufficient force to overcome the bias of the parking springs 530 in order to cause the parking piston 402 and nested/biased service piston 404 to expand so the pistons are moved to a retracted position away from the rotors 452 and stators 454.

During normal operation of the mine truck 10, the chambers 564 around the parking piston 402 may be pressurized to maintain the parking piston 402 and service piston in the retracted position (FIG. 13A) to release the parking brake force. As noted herein, this retracted position is similar to that shown in FIG. 12A, wherein no parking braking force is applied and no service braking force is applied.

When parking the mine truck 10 is desired or during an emergency situation, the fluid delivered to chambers 564 may be depressurized, allowing the springs 530 to urge the parking piston 402 and nested service piston 404 to an extended position toward the rotors 452 and stators 454 to create braking torque (FIG. 13B). While not shown, it will be appreciated that depressurization of the fluid at inlets 560 and chambers 564 may be achieved by closing a valve via a controller, such as a parking brake lever, to slow or prevent hydraulic fluid flow from a reservoir through the fluid supply pathways 562 to the chambers 564. As shown, seals 443, 445 are provided respectively on the parking piston 402 and gland ring 324 in order to seal the chambers 564 and prevent hydraulic fluid leakage into the interior of the cage portion 322.

In the embodiment shown, the blind bores 422 and 536 are generally concentric with the respective parking springs 530. Similarly, the aligned openings 550, 552 of the parking piston 402 and service piston 404 are located to be concentric with the springs 530 so that the service springs 532 extend within the parking springs 530. The released parking piston also releases the nested service piston.

Thus, the brake system 312 may provide improved braking performance with many of the advantages of a wet brake while avoiding many of the disadvantages of a wet brake. For example, the brake system 312 may exhibit a low wear rate, and thus a long life. The absence of oil in the interior spaces of the cage portion 322 and/or on the rotors 452 and stators 454 avoids the parasitic drag caused by oil in wet brakes, and further avoids the need for complex and heavy oil circulation equipment.

While the present invention has been illustrated by the description of one or more embodiments thereof, and while the embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method and illustrative examples shown and described. Accordingly, departures may be made from such details without departing from the scope or spirit of the general inventive concept.

What is claimed is:

1. A brake system for a piece of equipment having a frame and a shaft rotatable relative to the frame, the brake system comprising:
   a series of rotors and stators, including a plurality of rotors configured to be operatively coupled to the shaft and configured to rotate with the shaft relative to the frame, and a plurality of stators configured to be operatively coupled to the frame and configured to be fixed against rotation relative to the frame;

a service brake system including an annular service piston positioned to extend continuously around the series of rotors and stators such that pressurization of fluid in the service brake system acts on the service piston opposite the series of rotors and stators and drives the service piston to continuously engage around the series of rotors and stators such that the rotors and stators are compressed together and thereby create braking torque; and a parking brake system including an annular parking piston positioned to extend continuously around the series of rotors and stators, at least one parking piston spring creating a parking piston spring bias acting on the parking piston to drive the parking piston to continuously engage around the series of rotors and stators such that the rotors and stators are compressed together and thereby create braking torque, wherein the service piston is configured for nesting with the parking piston such that the service piston is positioned between the parking piston and the series of rotors and stators, wherein the parking piston and the service piston are configured to continuously engage together around the series of rotors and stators to thereby create the braking torque, wherein the brake system is configured such that the series of rotors and stators is free from oil flow, wherein the service piston is positioned between the parking piston and the series of rotors and stators such that when a braking force is applied to the parking piston, the braking force is applied by the parking piston to the service piston and by the service piston to the series of rotors and stators, and wherein at least one service piston spring creating a service piston spring bias on the service piston is positioned coaxially with the at least one parking piston spring creating the parking piston spring bias acting on the parking piston.

2. The brake system of claim 1, wherein the service piston is held in a nested position with the parking piston by the at least one service piston spring for creating a service piston spring bias, the pressurization of fluid in the service brake system acting on the service piston to overcome the service piston spring bias and separate the service piston from the parking piston to create braking torque.

3. The brake system of claim 1, wherein the at least one parking piston spring creating the parking piston spring bias acting on the parking piston is one of a plurality of parking piston springs positioned around the annular parking piston for creating the parking piston spring bias acting on the parking piston.

4. The brake system of claim 1, wherein at least one of the rotors or stators comprises carbon-carbon.

5. The brake system of claim 1, further comprising a gland ring configured for surrounding the service piston and parking piston, the gland ring having at least one seal element configured for sealing at least one of the service piston and parking piston for containment of pressurized fluid acting on the at least one service piston and parking piston for creating brake torque.

6. The brake system of claim 5, wherein the at least one seal element is configured for sealing each of the service piston and parking piston for containment of pressurized fluid acting on the service piston and parking piston for creating brake torque.

7. A piece of equipment comprising:
a frame;
a shaft rotatable relative to the frame; and
a brake system comprising:
a series of rotors and stators, including a plurality of rotors operatively coupled to the shaft and rotatable with the shaft relative to the frame, and a plurality of stators operatively coupled to the frame and fixed against rotation relative to the frame;

a service brake system including an annular service piston positioned to extend continuously around the series of rotors and stators such that pressurization of fluid in the service brake system acts on the service piston opposite the series of rotors and stators and drives the service brake piston to continuously engage around the series of rotors and stators such that the series of rotors and stators are compressed together and thereby create braking torque; and a parking brake system including an annular parking piston positioned to extend continuously around the series of rotors and stators, at least one parking piston spring creating a parking piston spring bias acting on the parking piston to drive the parking piston to continuously engage around the series of rotors and stators such that the rotors and stators are compressed together and thereby create braking torque, wherein the service piston is configured for nesting with the parking piston such that the service piston is positioned between the parking piston and the series of rotors and stators, wherein the parking piston and the service piston are configured to continuously engage together around the series of rotors and stators to thereby create the braking torque, wherein at least one of the rotors or stators comprises carbon-carbon, wherein the shaft includes a longitudinal axis about which the rotors are configured to rotate, the rotors and stators being movable along the longitudinal axis between a free position in which the rotors and stators are spaced apart from each other and a braking position in which the rotors and stators are clamped together, wherein the service piston is positioned between the parking piston and the series of rotors and stators such that a line parallel to the longitudinal axis intersects each of the parking piston, the service piston, and the series of rotors and stators, and wherein at least one service piston spring creating a service piston spring bias on the service piston is positioned coaxially with the at least one parking piston spring creating the parking piston spring bias acting on the parking piston.

8. The piece of equipment of claim 7, wherein the service piston is held in a nested position with the parking piston by the at least one service piston spring for creating a service piston spring bias, the pressurization of fluid in the service brake system acting on the service piston to overcome the service piston spring bias and separate the service piston from the parking piston to create braking torque.

9. The piece of equipment of claim 7, wherein the at least one parking piston spring creating a parking piston spring bias acting on the parking piston is one of a plurality of parking piston springs positioned around the annular parking piston for creating the parking piston spring bias acting on the parking piston.

10. The piece of equipment of claim 7, further comprising a gland ring configured for surrounding the service piston and parking piston, the gland ring having at least one seal element configured for sealing at least one of the service piston and parking piston for containment of pressurized fluid acting on the at least one service piston and parking piston for creating brake torque.

11. The piece of equipment of claim 10, wherein the at least one seal element is configured for sealing each of the service piston and parking piston for containment of pressurized fluid acting on the service piston and parking piston for creating brake torque.

12. The piece of equipment of claim 11, wherein the parking piston is positioned radially inwardly of the gland ring.

13. The piece of equipment of claim 10, wherein a boot is positioned between an outer radial edge of the service piston and a radial edge of the gland ring.

14. The piece of equipment of claim 7, wherein the brake system is configured such that the series of rotors and stators is free from oil flow.

15. The brake system of claim 6, wherein the parking piston is positioned radially inwardly of the gland ring.

16. The brake system of claim 5, wherein a boot is positioned between an outer radial edge of the service piston and a radial edge of the gland ring.

17. The piece of equipment of claim 7, wherein the service piston is positioned between the parking piston and the series of rotors and stators such that when a braking force is applied to the parking piston, the braking force is applied by the parking piston to the service piston and by the service piston to the series of rotors and stators.

18. The brake system of claim 1, wherein:
the shaft includes a longitudinal axis about which the rotors are configured to rotate, the rotors and stators being movable along the longitudinal axis between a free position in which the rotors and stators are spaced apart from each other and a braking position in which the rotors and stators are clamped together, and
the service piston is positioned between the parking piston and the series of rotors and stators such that a line parallel to the longitudinal axis intersects each of the parking piston, the service piston, and the series of rotors and stators.

19. A brake system for a piece of equipment having a frame and a shaft rotatable relative to the frame, the brake system comprising:
a series of rotors and stators, including a plurality of rotors configured to be operatively coupled to the shaft and configured to rotate with the shaft relative to the frame, and a plurality of stators configured to be operatively coupled to the frame and configured to be fixed against rotation relative to the frame;
a service brake system including an annular service piston positioned to extend continuously around the series of rotors and stators such that pressurization of fluid in the service brake system acts on the service piston opposite the series of rotors and stators and drives the service piston to continuously engage around the series of rotors and stators such that the rotors and stators are compressed together and thereby create braking torque; and
a parking brake system including an annular parking piston positioned to extend continuously around the series of rotors and stators, at least one parking piston spring creating a parking piston spring bias acting on the parking piston to drive the parking piston to continuously engage around the series of rotors and stators such that the rotors and stators are compressed together and thereby create braking torque,
wherein the service piston is configured for nesting with the parking piston such that the service piston is positioned between the parking piston and the series of rotors and stators,
wherein the parking piston and the service piston are configured to continuously engage together around the series of rotors and stators to thereby create the braking torque,
wherein the brake system is configured such that the series of rotors and stators is free from oil flow,
wherein the service piston is positioned between the parking piston and the series of rotors and stators such that when a braking force is applied to the parking piston, the braking force is applied by the parking piston to the service piston and by the service piston to the series of rotors and stators, and
wherein a parking piston fluid inlet port supplies fluid to a parking piston chamber on a same side of the parking piston as the series of rotors and stators such that pressurization of the parking piston chamber is configured to overcome the parking piston spring bias acting on the parking piston.

* * * * *